(12) United States Patent
Hoogzaad

(10) Patent No.: US 8,258,719 B2
(45) Date of Patent: Sep. 4, 2012

(54) METHOD AND CIRCUIT ARRANGEMENT FOR REGULATING A LED CURRENT FLOWING THROUGH A LED CIRCUIT ARRANGEMENT, AND ASSOCIATED CIRCUIT COMPOSITION AND LIGHTING SYSTEM

(75) Inventor: Gian Hoogzaad, Mook (NL)

(73) Assignee: NXP B.V., Eindhoven (NL)

( * ) Notice: Subject to any disclaimer, the term of this patent is extended or adjusted under 35 U.S.C. 154(b) by 235 days.

(21) Appl. No.: 12/864,803

(22) PCT Filed: Jan. 28, 2009

(86) PCT No.: PCT/IB2009/050342
§ 371 (c)(1),
(2), (4) Date: Jul. 27, 2010

(87) PCT Pub. No.: WO2009/095865
PCT Pub. Date: Aug. 6, 2009

(65) Prior Publication Data
US 2010/0315016 A1 Dec. 16, 2010

(30) Foreign Application Priority Data
Jan. 30, 2008 (EP) .................... 08101113

(51) Int. Cl.
G05F 1/00 (2006.01)
H05B 37/02 (2006.01)
H05B 39/04 (2006.01)
H05B 41/36 (2006.01)

(52) U.S. Cl. ......... 315/291; 315/302; 315/307; 315/308

(58) Field of Classification Search .................. None
See application file for complete search history.

(56) References Cited

U.S. PATENT DOCUMENTS

| 7,276,861 | B1 | 10/2007 | Shteynberg | |
|---|---|---|---|---|
| 7,511,436 | B2 * | 3/2009 | Xu | 315/307 |
| 7,723,926 | B2 * | 5/2010 | Mednik et al. | 315/291 |

(Continued)

FOREIGN PATENT DOCUMENTS
WO 2004100614 A1 11/2004
(Continued)

OTHER PUBLICATIONS
International Search Report (PCT) Application No. IB2009/050342 mailed Apr. 1, 2010.

Primary Examiner — Anh Tran

(57) ABSTRACT

The invention provides a method for regulating a LED current (ILED) flowing through a LED circuit arrangement at a mean LED current level. The method includes establishing an oscillating converter current (IL), establishing a first and a second current control indicator representative of a flow of a converter current (IL); regulating a peak and valley current level of the converter current in dependence on the first current control indicator; controlling a converter current period (T) of an oscillation of the converter current in dependence on the second current control indicator to be within a period control range (Tref) and feeding at least part of the converter current to the LED circuit arrangement. The invention also provides a circuit arrangement for regulating a LED current using the method, a LED driver IC using the circuit arrangement, a circuit composition with at least one LED and the circuit arrangement, and a lighting system with the circuit composition.

19 Claims, 15 Drawing Sheets

| U.S. PATENT DOCUMENTS | | | | FOREIGN PATENT DOCUMENTS | | |
|---|---|---|---|---|---|---|
| 2005/0007035 A1 | 1/2005 | Sloan et al. | | WO | 2006062484 A1 | 6/2006 |
| 2005/0243022 A1 | 11/2005 | Negru | | WO | 2006093870 A1 | 9/2006 |
| 2006/0232219 A1 | 10/2006 | Xu | | WO | 2007049198 A1 | 5/2007 |
| 2007/0262724 A1* | 11/2007 | Mednik et al. ............... 315/125 | | * cited by examiner | | |

Fig 1a _Prior Art_
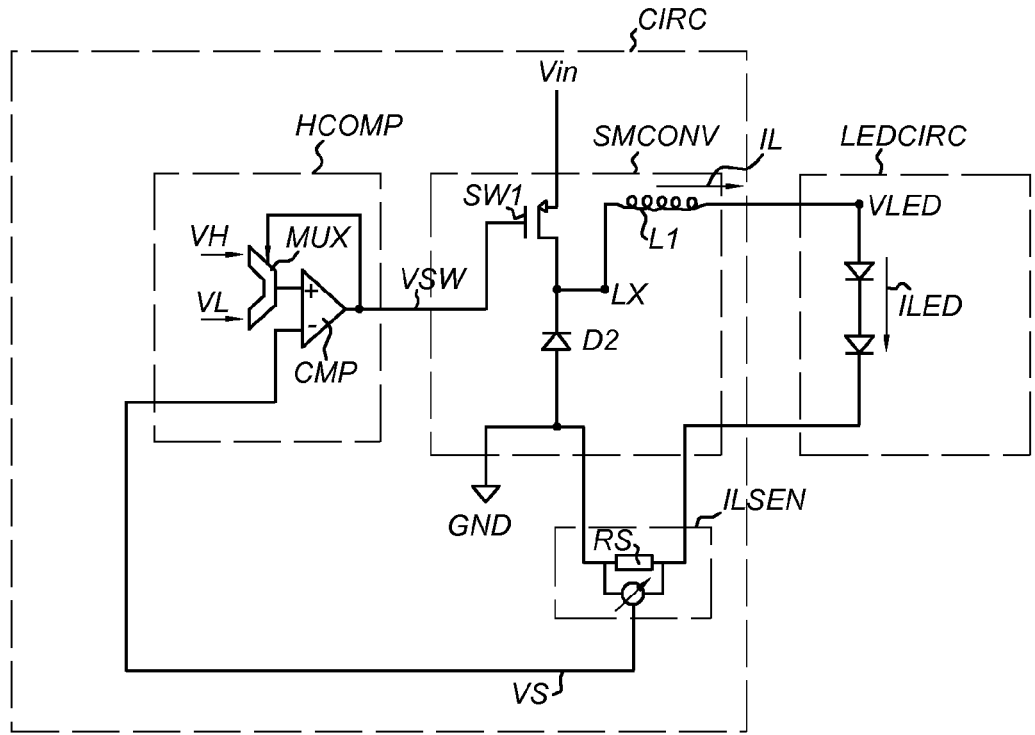
Fig 1b
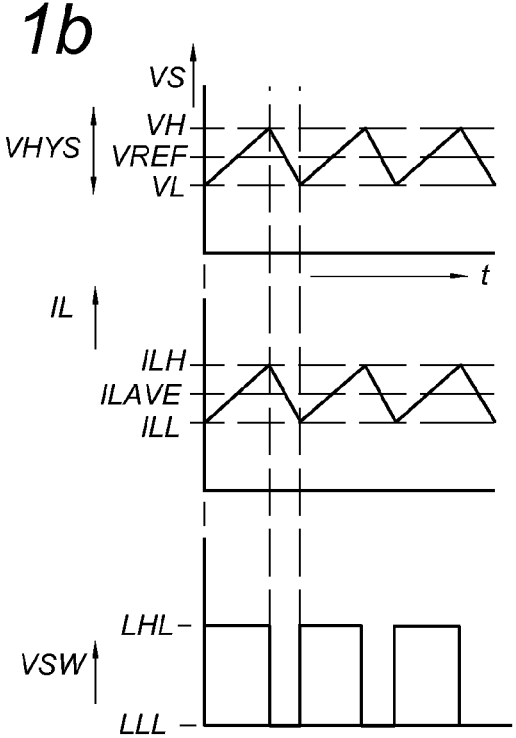

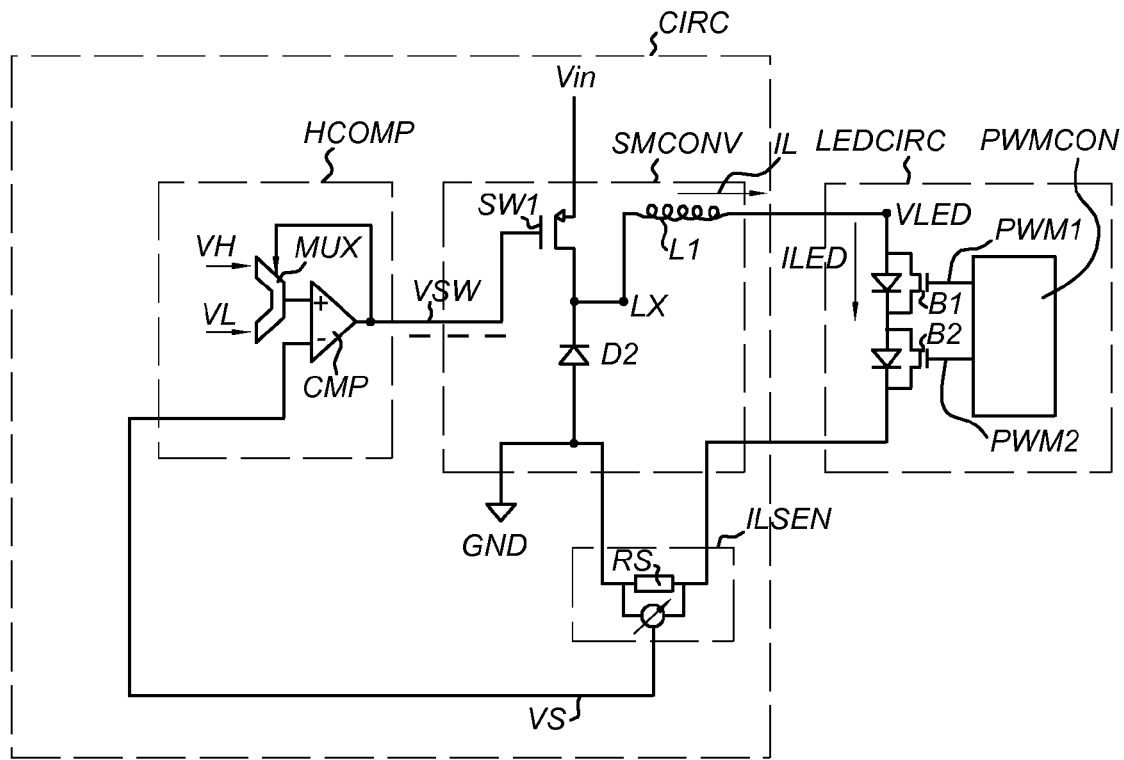
Fig 2 *Prior Art*

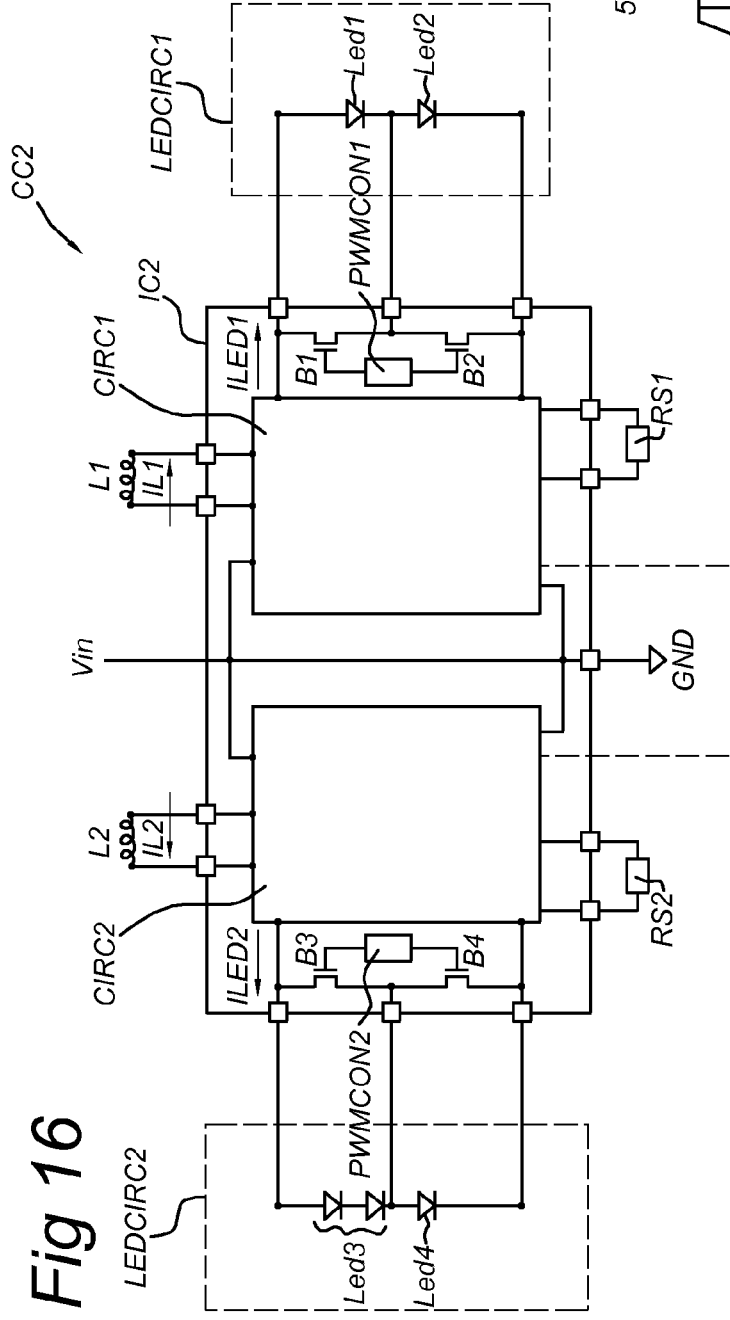
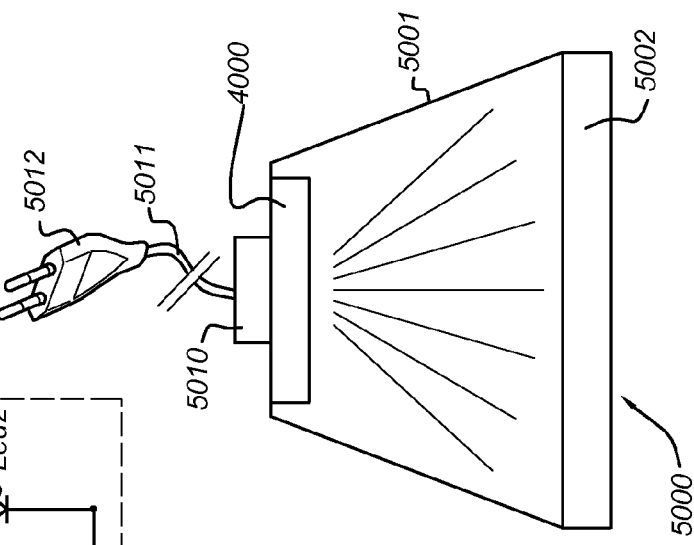
Fig 16
Fig 17

METHOD AND CIRCUIT ARRANGEMENT FOR REGULATING A LED CURRENT FLOWING THROUGH A LED CIRCUIT ARRANGEMENT, AND ASSOCIATED CIRCUIT COMPOSITION AND LIGHTING SYSTEM

TECHNICAL FIELD

The invention relates to a method regulating a LED current flowing through a LED circuit arrangement at a mean LED current level. The invention further relates to a circuit arrangement for regulating a LED current flowing through a LED circuit arrangement at a mean LED current level. The invention further relates to a LED driver IC. The invention further relates to a circuit composition and to a LED lighting system.

BACKGROUND

The light output of a light emitting diode (LED) is generally controlled by regulating a current level of a LED current through the LED. The LED current may be further modulated with, e.g. a pulse width modulation (PWM) scheme. In such a PWM-scheme, the LED receives the LED current in a periodic sequences of pulses of a certain width, while the width of the pulses is modulated from a first pulse width to a second pulse width when the effective light output is to be changed from a first light output level to a second light output level.

A LED drive method and a LED drive circuit thus generally comprise a current source, providing a constant current or an oscillating current with an average current level, and a switch associated with the LED in order to control a path of the current and in order to achieve the pulse width modulation of the LED current.

The switch may be in series with the LED, thus controlling the path of the current by interrupting the path of the current in order to achieve the pulse width modulation.

The switch may alternatively be in parallel with the LED, which will be referred to as a bypass switch. The bypass switch controls the path of the current by either guiding the path of the current through the LED or guiding the path of the current through a bypass path parallel to the LED in order to achieve the pulse width modulation. One of the advantages of such a bypass switch approach is that the current continues to flow, either through the LED or though the bypass path, which allows the use of very efficient current sources, such as a switch-mode current source. This is especially advantageous when a plurality of LEDs are to be operated at a common current level but with a possibly different pulse width between different LEDs from the plurality of LEDs. The LEDs may then be arranged in a plurality of LED segments connected in series, each LED segment comprising a single LED or two or more LEDs, the two or more LEDs preferably arranged in series, and each of the LED segments being associated with a bypass switch in parallel to the corresponding LED segment. By operating the bypass switches independently, the effective light output of each of the LED segments may be varied independently.

An example of a current source is described in WO2004100614A1. WO2004100614A1 describes a LED current control method and circuit for accurately and quickly regulating the mean amperage of LED current during all operating conditions including a change in the input line of a power source or in a change in a load of the LED network. The method comprises controlling the LED current to oscillate, e.g. in a triangular or saw-tooth manner, between a peak amperage and a valley amperage, with the mean amperage being the average of the peak amperage and the valley amperage, by an alternate controlling of an increase and a decrease of the LED current in response to each crossover by a converter current sensing voltage of a lower trip voltage and an upper trip voltage in a negative and a positive direction respectively. A circuit using such a method may be referred to as an example of a switch-mode converter with hysteretic control on the LED current. The peak-to-valley range of the peak amperage to the valley amperage may be referred to as the hysteretic current window. The peak-to-valley range of the upper trip voltage to the lower trip voltage may be referred to as the hysteretic voltage window, or, in short, the hysteretic window.

The method and circuit thus achieve regulating the mean current level independent of the operating conditions. In particular, when the method and circuit are used to operate a LED circuit arrangement comprising a plurality of LED segments with corresponding bypass switches in an arrangement as described above. Operating the bypass switches to vary the light output of the individual LED segments results in a variation of the load of the LED circuit arrangement. The switch-mode converter with hysteretic control is well suited to accurately and quickly deliver a current with a substantially constant mean current level to such a LED circuit arrangement with varying load due to the operation of the bypass switches.

However, using the method of WO2004100614A1 results in a varying frequency of the oscillation of the LED current when the load of the LED circuit arrangement is varying, e.g. due to the operation of the bypass switches as described above. When the load of the LED circuit arrangement is varying significantly, the frequency variation may be large.

This large variation of frequency has several negative side-effects. For example, the components in an input or output filter of the hysteretic switch-mode converter need to be dimensioned such as to reduce the side-effects to a sufficiently low level for all possible frequencies. The requirements stemming from these side-effects are for example preventing audible noise, preventing visible and potentially annoying fluctuations in the light output of the LEDs, complying to conducted and radiated electromagnetic interference (EMI) regulations, guaranteeing lifetime of electrolytic capacitors, and optimizing core versus conduction losses in inductors. For example, in order to guarantee that the frequency does not, during all operating conditions, move into the range of audible frequencies, which may be annoying, a small inductor is needed in the output filter, which negatively impacts the accuracy of the LED current level. As another example, in order to achieve a small ripple of the LED current when the load of the LED circuit arrangement is varying significantly while being tolerant to changes in the input line of the power source, a large capacitor may be needed to filter the input voltage.

SUMMARY

The present invention aims to reduce the side-effects of the known switch-mode converters with hysteretic control and aims to provide a circuit arrangement and a method which can handle a significant load variation of the LED network with reduced negative side-effects.

For this purpose, the method according to the invention comprises:
establishing a converter current;
establishing a first current control indicator representative of a current level of the converter current;
establishing an oscillation of the converter current between a valley current level and a peak current level in dependence on at least the first current control indicator, wherein the mean LED current level corresponds to a weighted average of the peak current level and the valley current level of the converter current;
establishing a second current control indicator representative of a flow of the converter current;
controlling a converter current period of the oscillation of the converter current to be within a period control range, the controlling being performed in dependence on at least the second current control indicator, and
feeding the LED circuit arrangement with at least part of the converter current.

The first and second current control indicator may be a signal, e.g. running over an electrical connection between two components of a circuit arrangement, or a value, e.g. a value of a parameter stored in a register or a memory.

The mean current level of the LED current may, e.g. be regulated in a manner similar to that of the prior-art switch-mode converter with hysteretic control, as may, e.g. be applied for a Buck-converter feeding a LED circuit arrangement of a plurality of LEDs in a series arrangement with bypass switches in parallel to each of the LEDs. The hysteretic control is applied on the converter current. For such a converter, the converter current behaves as a continuous, typically sawtooth-shaped current and the full converter current established in the converter is fed as the LED current to the LED circuit arrangement with the mean LED current level corresponding to the arithmetic average of the peak current level and the valley current level. When the LED circuit arrangement comprises a capacitive filter in parallel to the series arrangement of the plurality of LEDs, the LED current behaves as a time-filtered version of the converter current. The peak and valley values of the LED current may then differ from the respective values of the converter current, while the mean LED current level may still level correspond to the arithmetic average of the peak current level and the valley current level. For different types of converters, such as for example a Buck-Boost converter, the LED current may be discontinuous even when the converter current is continuous: the hysteretic control may then be performed on the converter current, and part of the converter current will be fed to the LED circuit arrangement as the LED current. The mean LED current level may then correspond to a weighted average of the peak current level and the valley current level with different weights for the peak current level and the valley current level, to take the effects if the partial feeding into account.

It should be remarked that the method according to the invention monitors and controls the converter current, whereas the method of WO2004100614A1 uses the LED current. These currents are the same for a Buck converter feeding a LED circuit arrangement of a series arrangement of a plurality of LEDs, but may be different for other types of converters, e.g. for a Buck-Boost converter which may be arranged, depending on its implementation, to feed the LED circuit arrangement only during the part of the converter current period during which the converter current is increasing or only during the part of the converter current period during which the converter current is decreasing. For those types of converters, hysteretic control is preferably performed on the converter current.

The period control range may be a narrow window around a pre-determined set-point frequency, in order to achieve a substantially constant duration of the converter current period.

The period control range may alternatively be, e.g. a window between a pre-determined lower threshold duration and a pre-determined upper threshold duration, wherein the lower and upper thresholds duration may, e.g. be associated with preferred values of electrical components in the circuit arrangement or electrical components connected to the circuit arrangement, such as capacitors or inductors. Alternatively, the lower and upper thresholds duration may, e.g. be associated with a preferred frequency range, such as a frequency range excluding audible frequencies, a frequency range associated with specific electromagnetic interference risks, or a frequency range excluding annoying periodic fluctuations in the light output level, known as flicker.

The period control range may have a fixed value, which may be a pre-determined constant value. The period control range may alternatively be adjusted during operation, e.g. to spread the spectral energy associated with the operation over a spectral band in order to meet practical or legal electromagnetic compatibility requirements.

Controlling the converter current period may be performed by a variety of different methods, employing, e.g. a direct determination of the converter current period duration such as a measurement on an electrical signal associated with the circuit arrangement, or, e.g. an indirect determination of the converter current period duration. Embodiments for controlling the converter current period are described below.

In an embodiment of the method,
establishing the first current control indicator comprises:
monitoring a current level of the converter current and using the monitored current level as the first current control indicator;
establishing the oscillation of the converter current comprises:
establishing an upper trip current level and a lower trip current level as control crossover thresholds, the upper trip current level being associated with the peak current level of the converter current and the lower trip current level being associated with the valley current level of the converter current;
controlling an increase of the converter current from a valley current level to a peak current level in response to each crossover of the lower trip current level by the current level of the converter current in a negative direction, the controlling of the increase of the converter current being associated with an increase time duration, and
controlling a decrease of the converter current from the peak current level to the valley current level in response to each crossover of the upper trip current level by the current level of the converter current in a positive direction, the controlling of the decrease of the converter current being associated with a decrease time duration, and
in controlling the converter current period of the oscillation of the converter current, the converter current period corresponds to a sum of the increase time duration and the decrease time duration.

The mean current level of the LED current is thus regulated in a manner similar to that of the prior-art switch-mode converter with hysteretic control. The method controls the mean LED current level by controlling the converter current to oscillate between a peak current level and a valley current level in response to each crossover by the converter current of the lower trip current level and the upper trip current level in the negative and the positive direction respectively. The lower trip current level and the upper trip current level may be established in dependence on the required mean current level of the LED current.

The oscillation comprises alternated control periods with the increase time duration in which the converter current is increased and with the decrease time duration in which the converter current is decreased.

The invention provides a new inventive aspect to the switch-mode converter with hysteretic control in providing additionally a control of the converter current period, or, equivalently the frequency, of the oscillation of the converter current. The converter current period is controlled to be within a range, referred to as the period control range.

In a further embodiment of the method,
establishing the first current control indicator comprises:
    establishing a converter current sensing voltage representative of a flow of the converter current through the LED circuit arrangement;
regulating the mean current level of the converter current comprises
    establishing an upper trip voltage and a lower trip voltage as control crossover thresholds, the upper trip voltage (being associated with the peak current level of the converter current, the lower trip voltage being associated with the valley current level of the converter current, and the mean current level being an average of the peak current level and the valley current level of the converter current;
    controlling an increase of the converter current from the valley current level to the peak current level in response to each crossover of the lower trip voltage by the converter current sensing voltage in a negative direction, the controlling of the increase of the converter current being associated with an increase time duration, and
    controlling a decrease of the converter current from the peak current level to the valley current level in response to each crossover of the upper trip voltage by the converter current sensing voltage in a positive direction, the controlling of the decrease of the converter current being associated with a decrease time duration, and
in controlling the converter current period of the oscillation of the converter current, the converter current period corresponds to a sum of the increase time duration and the decrease time duration.

The current level of the converter current is thus represented by the converter current sensing voltage, allowing an easier electrical signal manipulation and signal processing than a current signal. The converter current sensing voltage may, e.g. be the voltage over a resistor in the path of the converter current.

The method may further comprise
    determining an adjusted upper trip voltage value and an adjusted lower trip voltage value in dependence with the converter current period,
    establishing the upper trip voltage and the lower trip voltage from the adjusted upper trip voltage value and the adjusted lower trip voltage value, and
    wherein controlling the converter current period to be within the period control range is associated with using the adjusted upper trip voltage value) and the adjusted lower trip voltage in controlling the increase of the converter current and controlling the decrease of the converter current.

The upper trip voltage and the lower trip voltage can have different values for achieving the same mean current level, as the mean current level may be the same for different pairs of peak current level and valley current level.

However, each choice for a specific upper trip voltage and a specific lower trip voltage, associated with a specific peak current level and a specific valley current level, results in a specific, and generally different, converter current period when the current level is regulated without controlling the converter current period. By adjusting the upper trip voltage and the lower trip voltage while maintaining the mean current level, the associated decrease time duration and increase time duration can be adjusted. Hence the converter current period can be controlled by adjusting the upper trip voltage and the lower trip voltage. One may note that adjusting the upper trip voltage and the lower trip voltage may result in an adjustment of the peak current level and valley current level, at the same mean current level.

Controlling may be based on the observation that the converter current period will become smaller when the difference between the upper trip voltage value and the lower trip voltage becomes smaller, while the converter current period will become larger when the difference becomes larger, as the speed of increase and the speed of decrease of the converter current are unchanged when the load of the LED circuit arrangement is unchanged. Controlling can thus be performed in a defined direction with, e.g. predetermined step sizes of the adjustments to the upper trip voltage and the lower trip voltage, the adjustments being done to the upper trip voltage and the lower trip voltage in opposite directions. This allows, e.g. the use of a feed-back control loop of which a variety of practical implementations will be familiar to a person skilled in the art.

In an embodiment, determining the adjusted upper trip voltage and the adjusted lower trip voltage comprises retrieving at least one voltage-related value from a memory.

The memory may, e.g. comprise pre-determined values for the upper trip voltage and the lower trip voltage, or one or two adjustment values. The at least one voltage value may, e.g. be organized in the memory as a function of a converter current period, a load of the LED circuit arrangement, or any other parameters associated with the converter current period associated with specific values of the upper trip voltage and the lower trip voltage.

In an embodiment, the adjusted upper trip voltage and the adjusted lower trip voltage are determined from the upper trip voltage, the lower trip voltage and an adjustment voltage.

The adjustment voltage may relate to the difference between the adjusted upper trip voltage and the adjusted lower trip voltage.

Use of a single adjustment voltage has the advantage that in determining the adjusted upper trip voltage and the adjusted lower trip voltage, the average of these two voltages may be kept unchanged, e.g. by adding half the adjustment voltage to the upper trip voltage to achieve the adjusted upper trip voltage and by subtracting half the adjustment voltage from the lower trip voltage to achieve the adjusted lower trip voltage, as:

$$VHA = VH + VADJ/2,$$

$$VLA = VL - VADJ/2,$$

wherein VH denotes the upper trip voltage, VL denotes the lower trip voltage, VHA denotes the adjusted upper trip voltage, VLA denotes the adjusted lower trip voltage and VADJ denotes the adjustment voltage.

In an embodiment, the adjusted upper trip voltage and the adjusted lower trip voltage are determined from a reference voltage and an hysteresis voltage.

Use of a reference voltage and an hysteresis voltage has the advantage that in determining the adjusted upper trip voltage and the adjusted lower trip voltage, the average of these two voltages, relating to the mean current level, can be determined from the reference voltage, such that an additional change in the mean current level can be easily incorporated in the controlling. The adjusted upper trip voltage and the adjusted lower trip voltage may then be determined by adding half the hysteresis voltage to the reference voltage to achieve the adjusted upper trip voltage and by subtracting half the hysteresis voltage from the reference voltage to achieve the adjusted lower trip voltage, as:

$$VHA = VREF + VHYS/2,$$

$$VLA = VREF - VHYS/2,$$

wherein VHA denotes the adjusted upper trip voltage, VLA denotes the adjusted lower trip voltage, VREF denotes the reference voltage and VHYS denotes the hysteresis voltage.

In an embodiment, establishing the second current control indicator comprises measuring a converter current period duration of the converter current period, and the measured converter current period duration is used as the second current control indicator in controlling the converter current period.

Controlling the converter current period using the measured converter current period duration, as a feed-back control, has the advantage that a very accurate control may be achieved, as not only all known and/or anticipated effects can be incorporated in the controlling, but also other effects, e.g. accidental, occasional or ageing-related effects, are incorporated.

Measuring the converter current period duration may comprise acquiring a plurality of converter current period duration values and filtering the acquired values to obtain a measured converter current period duration that is substantially free from noise.

Measuring the converter current period duration may be performed with the converter current or the converter current sensing voltage as a measurement signal.

Measuring the converter current period duration may alternatively be performed with a control signal associated with controlling an increase and the decrease of the converter current as the measurement signal.

Measuring the converter current period duration may be performed using, e.g. analyzing a period, analyzing a frequency or analyzing a spectrum.

Measuring may comprise sampling the measurement signal with a high-frequency sampling clock, e.g. a system clock of a processor unit or a clock derived there from.

In an alternative embodiment, establishing the second current control indicator comprises determining a load associated with the LED circuit arrangement, and the load is used the second current control indicator in controlling the converter current period. In controlling the converter current period using the load, the load may be associated with an estimate of the converter current period.

The load associated with the LED circuit arrangement may be determined from, e.g. the operating conditions of the LED circuit arrangement. As an example, in the LED circuit arrangement comprising a plurality of LED segments with corresponding bypass switches as discussed above, the state of the plurality of bypass switches determines the load of the LED circuit arrangement. The state of the plurality of bypass switches may thus be used to estimate the load. Controlling the converter current period may then, e.g. comprise determining the adjusted upper trip voltage values and the adjusted lower trip voltage values from a small pre-determined table comprising the adjusted upper trip voltage values and the adjusted lower trip voltage values associated with the predetermine window of the converter current period as a function of the state of the plurality of bypass switches.

Controlling the converter current period in a feed-forward manner using the estimated converter current period duration has the advantage that a simple control may be achieved with a still sufficient accuracy.

Alternatively, the load associated with the LED circuit arrangement may be measured from the LED circuit arrangement. As an example, the voltage drop over the LED circuit arrangement may be associated with the load of the LED circuit arrangement. Measuring this voltage drop is thus suitable for determining the load. As an alternative example, signal levels of the signals controlling the bypass switches may be measured and used to determined the load.

In a further embodiment, establishing the second current control indicator comprises determining an estimate of a converter current period duration of the converter current period from the load, and the estimate of the converter current period duration is used as the second current control indicator in controlling the converter current period.

In an embodiment,
  the period control range is defined with a lower period threshold and an upper period threshold, and
  the lower duration threshold and the upper duration threshold are determined from a centre duration and a duration width, wherein the duration width is smaller than 10% of the centre duration.

The converter current period is thus controlled within a well-defined window.

The centre duration thus corresponds to centre frequency, and the duration width corresponds to a frequency band around this centre frequency.

In a further embodiment, the centre duration has a constant value.

The converter current period is thus controlled to remain at a substantially constant, fixed duration.

In an alternative further embodiment, the centre duration is varied over a spectral band.

The converter current period is thus controlled in a spread spectrum manner, to prevent a concentration of the spectral energy by distributing the spectral energy over a spectral band, e.g. in order to meet practical or legal electromagnetic compatibility requirements with a reduced amount of electromagnetic interference (EMI) filtering thereby achieving a cost advantage.

In embodiments of the method, the method further comprises:
  controlling a path of the LED current flowing through the LED circuit arrangement,
  wherein the LED circuit arrangement comprises a first LED segment and at least a second LED segment, the first LED segment being associated with a first switching element operable for controlling a path of the LED current through the first LED segment, the second LED segment being associated with a second switching element operable for controlling a path of the LED current through the second LED segment.

Controlling the path of the LED current flowing through the LED circuit arrangement by operating the first and the second switching element for controlling the path of the current through the first and the second LED segments is associated with varying the load of the LED circuit arrangement.

The effects of this load variation may be effectively diminished by controlling the converter current period using the method according to the invention.

In an embodiment of the method:
the first switching element is electrically parallel to the first LED segment,
the second switching element is electrically parallel to the second LED segment, and
the first and second switching elements are operated to select the path of the LED current to pass through the LED segment associated with the switching element or to bypass the LED segment associated with the switching element.

When the first switching element is open, the current will flow through the first LED segment. When the first switching element is closed, the current will flow through the first switching element and bypass the first LED segment.

When the second switching element is open, the current will flow through the second LED segment. When the second switching element is closed, the current will flow through the second switching element and bypass the second LED segment.

By operating the first and second switching elements, the path of the LED current is thus selected to pass selectively through the LED segments.

In an embodiment, the load is derived from a status of the first and second switching elements.

Determining the adjusted upper trip voltage value and the adjusted lower trip value may thus be performed from the status of the first and second switching elements without a direct measuring of the converter current period.

An embodiment of the method comprises
storing a hysteresis voltage for the status of the first and second switching elements in a memory unit before a change of status of at least one of the first and second switching elements, and
retrieving the hysteresis voltage for the status of the first and second switching elements from the memory unit after a change of status of at least one of the first and second switching elements.

This allows to memorize e.g. the adjusted upper trip voltage, the adjusted lower trip voltage, the upper trip voltage, the lower trip voltage, the adjustment voltage, the hysteresis voltage, after the LED circuit arrangement has been operated with a first load condition during which the voltage has been accurately determined in, e.g. a control emplying a feedback manner based on measuring the converter current period as described above. When the LED circuit arrangement is then at a later moment in time again set to operate with the first load condition, the memorized value can be retrieved, thus improving the speed of convergence of the feedback control.

The circuit arrangement according to the invention provides a circuit arrangement for regulating a LED current flowing through a LED circuit arrangement at a mean LED current level, the circuit being arranged for:
establishing a converter current;
establishing a first current control indicator representative of current level of the converter current through the circuit arrangement;
establishing an oscillation of the converter current between a valley current level and a peak current level in dependence on at least the first current control indicator, wherein the mean LED current level corresponds to a weighted average of the peak current level and the valley current level of the converter current;
establishing a second current control indicator representative of a flow of the converter current through the circuit arrangement;
controlling a converter current period of the oscillation of the converter current in dependence on the second current control indicator to be within a period control range, and
feeding the LED circuit arrangement with at least part of the converter current.

The circuit arrangement can be used to implement one of the method described above in detail. The circuit arrangement may, during use, be in electrical connection to a LED circuit arrangement and may cooperate with the LED circuit arrangement. The LED circuit arrangement may alternatively be included in the circuit arrangement. Embodiments of the circuit arrangement are described below.

In an embodiment of the circuit arrangement according to the invention:
for establishing the first current control indicator, the circuit arrangement comprises:
a converter current sensor operable to establish a converter current sensing voltage representative of the converter current flowing through the LED circuit arrangement;
for regulating the mean current level of the converter current, the circuit arrangement comprises:
a hysteretic comparator operable to establish an upper trip voltage and a lower trip voltage as control crossover thresholds, the upper trip voltage being associated with a peak current level of the converter current, the lower trip voltage being associated a valley current level of the converter current, the hysteretic comparator in electrical communication with the converter current sensor to receive the converter current sensing voltage,
wherein the hysteretic comparator is operable to output a switching control voltage at a first logic level in response to each crossover of the lower trip voltage by the converter current sensing voltage in a negative direction, and
wherein the hysteretic comparator is operable to output a switching control voltage at a second logic level in response to each crossover of the upper trip voltage by the converter current sensing voltage in a positive direction, and
a switch-mode converter operable to control a flow of the converter current through the circuit arrangement, the switch-mode converter in electrical communication with the hysteretic comparator to receive the switching control voltage,
wherein the switch-mode converter controls an increase of the converter current from the valley current level to the peak current level in response to the switching control voltage equaling the first logic level, the controlling of the increase of the converter current being associated with an increase time duration, and
wherein the switch-mode converter controls a decrease of the converter current from the peak current level to the valley current level in response to the switching control voltage equalling the second logic level, the controlling of the decrease of the converter current being associated with a decrease time duration, and
for controlling the converter current period of the oscillation of the converter current, the circuit arrangement comprises:
a converter current period controller operable to control the converter current period, the converter current period controller being in electrical communication with at least the hysteretic comparator;

wherein the converter current period corresponds to a sum of the increase time duration and the decrease time duration.

The converter current period controller thus cooperates with the converter current sensor, the hysteretic comparator and the switch-mode converter to regulate the mean LED current level as well as the converter current period.

The converter current sensor may comprise a resistor in the current path of the converter current and a voltage measurement unit arranged to measure the voltage over the resistor and to provide the measured voltage as the converter current sensing voltage.

The converter current sensor may alternatively cooperate with a resistor in the current path of the converter current and comprise a voltage measurement unit arranged to measure the voltage over the resistor and to provide the measured voltage as the converter current sensing voltage. The resistor may be a resistor external to the circuit arrangement but connected to the circuit arrangement. E.g. when the circuit arrangement is an integrated circuit, the resistor may be connected to the IC, and the IC may comprise the voltage meter to measure the voltage over the resistor.

In an embodiment, the converter current period controller comprises:
  a trip control voltage generator operable to establish a first trip control voltage and a second trip control voltage; and
  the hysteretic comparator is operable to establish the upper trip voltage and the lower trip voltage from the first trip control voltage and the second trip control voltage, the hysteretic comparator being in electrical communication with the trip control voltage generator to receive the first trip control voltage and the second trip control voltage.

As described above, by adjusting the upper trip voltage and the lower trip voltage while maintaining the mean current level, the associated decrease time duration and increase time duration can be adjusted. Hence the converter current period can be controlled by adjusting the upper trip voltage and the lower trip voltage.

In an embodiment, the converter current period controller comprises:
  a converter current period detector operable to establish the second current control indicator, the second current control indicator being associated with the converter current period, the converter current period detector being in electrical communication with at least one of the group consisting of the converter current sensor, the hysteretic comparator and a LED circuit load detector, to receive at least one of the group consisting of the converter current sensing voltage, the switching control voltage and a LED circuit load,
  wherein the trip control voltage generator is operable to establish the first trip control voltage and the second trip control voltage in response to the second current control indicator associated with the converter current period in order to control the converter current period to be within a period control range, the trip control voltage generator being in electrical communication with the converter current period detector to receive the second current control indicator.

The converter current period detector may be in electrical communication with the converter current sensor or the hysteretic comparator to receive the converter current sensing voltage. The converter current period detector may be operable to determine the converter current period duration from the converter current sensing voltage, e.g. by measuring the duration of the converter current period. The converter current period duration may then be used as the second current control indicator.

The converter current period detector may be in electrical communication with the hysteretic comparator to receive the switching control voltage. The converter current period detector may be operable to determine the converter current period duration from the switching control voltage. The converter current period duration may then be used as the second current control indicator.

The converter current period detector may be in electrical communication with the LED circuit load detector to receive the LED circuit load. The LED circuit load may then be directly used as the indicator. Alternatively, the LED circuit load may be used to estimate the converter current period duration, and the estimated converter current period duration may then be used as the second current control indicator.

The converter current period detector may fully or in part be implemented in a microprocessor in communication with the circuit arrangement.

In a further embodiment, the trip control voltage generator is operable to establish the first trip control voltage and the second trip control voltage from a reference voltage and a hysteresis voltage, and
  the trip control voltage generator is operable to control the hysteresis voltage in response to the second current control indicator in order to control the converter current period.

The hysteretic comparator is operable to establish the upper trip voltage and the lower trip voltage from the first trip control voltage and the second trip control voltage.

The reference voltage may relate to the mean current level and may be kept constant when the converter current period is controlled while keeping the mean current level unchanged.

The hysteresis voltage may relate to the oscillation of the current, and may be adjusted in order to control the converter current period.

Controlling the hysteresis voltage may also be referred to as controlling the hysteresis window or as controlling the hysteresis voltage window.

The first trip control voltage and the second trip control voltage may then be determined by adding half the hysteresis voltage to the reference voltage to achieve the first trip control voltage and by subtracting half the hysteresis voltage from the reference voltage to achieve the second trip control voltage, as:

$VC1 = VREF + VHYS/2$, $VC2 = VREF - VHYS/2$, wherein VC1 denotes the first trip control voltage, VC2 denotes the second trip control voltage, VREF denotes the reference voltage and VHYS denotes the hysteresis voltage.

In embodiments of the circuit arrangement, the circuit arrangement comprises a resistive digital-to-analogue converter,
  the resistive digital-to-analogue converter comprising:
    a converter reference voltage supply arranged to provide a converter reference voltage,
    a series circuit of resistors in electrical communication with the converter reference voltage supply, and
    a first and a second switch array comprising a plurality of switches,
    wherein each of the switches of the first and second switch array is in electrical communication with the series circuit of resistors tapping off at a corresponding position along the series circuit of resistors, and wherein each switch array is arranged to be controlled with a digital control word comprising a plurality of bits, the bits being associated with controlling the switches to tap off the series circuit of resistors at the corresponding position, and wherein the first trip control voltage and the second trip control voltage are tapped from the same series circuit of resistors with the first switch array and the second switch array respectively.

The resistive digital-to-analogue converter (R-DAC) thus provides stable and well-defined voltages.

By providing two switch arrays tapping of the same series circuit of resistors, a good correspondence is achieved between the two voltages tapped from the R-DAC.

The resistors in the series circuit of resistors may all have equal resistances.

Denoting the number of bits with B, the series circuit of resistors may, e.g. comprise a series arrangement of $2^{B-1}$ resistors, all resistors having an equal resistance, and each of the switch arrays may comprise $2^B$ switches. Such an inherent structure of the R-DAC guarantees that the average between two voltages tapped of the R-DAC remains the same when stepping up and down with the same value, i.e. with the same number of resistors.

As an example, when using an R-DAC with 1023 resistors, i.e. B=10, the digital control word is a 10-bit word with codes values between 0 and 1023. A situation may occur where for a first load of the LED circuit arrangement, the first trip control voltage corresponds to a code value of 814, the second trip control voltage corresponds to a code value of 776 and the converter current period has a first duration within the period control range. At a second load of the LED circuit arrangement, only slightly different from the first load, the method according to the invention controls the converter current period to remain within the period control range and to substantially maintain the first duration, e.g. by stepping the first control voltage up with one unit in the code values and the second control voltage down with one unit in the code values. When, in this example, the second load is only slightly different from the first load, this may be performed by adjusting the first trip control voltage to a new code value of 815 and the second trip control voltage corresponds to a new code value of 775.

A further embodiment comprises a R-DAC memory, wherein the digital control word of the R-DAC switch settings are stored in and retrieved from the R-DAC memory.

A setting may be stored when the load changes from a first load to a second load, in order to memorize the setting for the first load. When at a later moment in time the load returns back to the first load, the memorized setting can be retrieved. As a result, the settling time for the controlling will be reduced.

The R-DAC memory may be comprised with the R-DAC; when the R-DAC is implemented in an integrated circuit, the R-DAC memory may be implemented in the same integrated circuit.

The R-DAC memory may also be comprised in an external memory, e.g. in a memory associated with a microprocessor in communication with the circuit arrangement.

In an embodiment of the circuit arrangement the circuit arrangement comprises a memory unit comprising a table comprising voltage settings for a plurality of indicator values, and the trip control voltage generator is operable to retrieve voltage settings in response to the second current control indicator in order to establish the first trip control voltage and the second trip control voltage.

The memory unit may be pre-loaded with the table comprising voltage settings for the plurality of indicator values.

The memory may be updated during operation of the circuit arrangement, e.g. when controlling the converter current period resulted in a voltage setting deviating from the voltage setting retrieved from the table for one of the indicator values.

For example, the memory may comprise a table of adjustment voltage values for a plurality of load values, or a table of upper trip voltage values and lower trip voltage values for a plurality of load values.

An embodiment comprises a spread-spectrum generator arranged for varying a centre duration of the period control range over a pre-determined spectral band.

This allows the converter current period to be controlled in a manner to prevent a concentration of the spectral energy by distributing the spectral energy over a spectral band, e.g. in order to meet practical or legal electromagnetic compatibility requirements.

In an embodiment of the circuit arrangement, the hysteretic comparator comprises a comparator having an inverting input and a non-inverting input, the converter current sensing voltage is applied to the inverting input of the comparator, and the hysteretic comparator comprises a multiplexer, the multiplexer being operable to provide the upper trip voltage and the lower trip voltage time-sequentially as a trip voltage to the non-inverting input of the comparator.

The comparator thus is operable to compare the converter current sensing voltage to either the upper trip voltage or the lower trip voltage, to output the switching control voltage at the first logic level in response to each crossover of the lower trip voltage by the converter current sensing voltage in the negative direction, and to output the switching control voltage at the second logic level in response to each crossover of the upper trip voltage by the converter current sensing voltage in the positive direction.

The outputting of the switching control voltage at the first logic level is associated with the increase time duration. The outputting of the switching control voltage at the second logic level is associated with the decrease time duration.

In an embodiment, the switch-mode converter is arranged for charging and discharging an inductive output filter, the inductive output filter being, during use, in electrical communication with the LED circuit arrangement.

The switch-mode converter is thus operable to control the increase of the converter current from the valley current level to the peak current level in response to the switching control voltage equalling the first logic level over the increase time duration, and operable to control the decrease of the converter current from the peak current level to the valley current level in response to the switching control voltage equalling the second logic level over the decrease time duration.

The inductive output filter may be comprised in the switch-mode converter, or alternatively be externally connected to the switch-mode converter or the circuit arrangement.

The switch-mode converter may further comprise a component selected from the group consisting of a diode and a second switch, the second switch being in electrical communication with the hysteretic comparator to be closed and opened as a function of the switching control voltage, the component being in electrical communication with the switch via an output node, and the output node being, during use, in electrical communication with the LED circuit arrangement.

With these components, a so-called half-bridge structure is constructed allowing to switch the output node between an upper and a lower supply voltage.

The switch-mode converter may comprise an inductive output filter, the inductive output filter being, during use, in electrical communication with the LED circuit arrangement.

The inductor may be changed and discharged, the charging and discharging being controlled by the switch of the switch-mode converter. Charging and discharging of the inductor may be associated with increasing and decreasing of the converter current.

The inductor may, e.g. be connected to a half-bridge structure described above to form a so-called Buck converter, Buck-Boost converter or Boost converter.

In an embodiment, the converter current sensor is arranged to determine the converter current sensing voltage from a voltage drop over a resistor, the resistor being arranged to transmit the converter current flowing through LED circuit arrangement.

The resistor can be outside or inside the circuit arrangement. In particular, when the circuit arrangement is integrated in an integrated circuit, the resistor is preferably outside the circuit arrangement.

In a further embodiment, the circuit arrangement comprises the resistor and the resistor is in electrical communication with the LED circuit arrangement and with the converter current sensor.

In an embodiment of the circuit arrangement, the circuit arrangement further comprises:
  a power supply operable to deliver an input supply voltage, the power supply being in electrical communication with the switch-mode converter to supply the switch-mode with the input supply voltage, and
  a capacitive input filter in electrical communication with the power supply.

The capacitive input filter is usually applied to reduce sensitivity to variations in the supply voltage, in particular to reduce the sensitivity to disturbances on the supply voltage. Usually with prior-art hysteretic control, a strong filtering is required with a large capacitor, because at the lower conversion frequencies input current is drawn from the input capacitor for a relatively long duration. With the invention, a less strong filtering can be accepted, and a smaller capacitor can be applied, which may be attractive because of cost considerations.

In an embodiment of the circuit arrangement,
  a LED controller is in electrical communication with the LED circuit arrangement, and
  the LED circuit arrangement comprises a first LED segment and at least a second LED segment, the first LED segment being associated with a first switching element operable for controlling a path of the LED current through the first LED segment, the second LED segment being associated with a second switching element operable for controlling a path of the LED current through the second LED segment,
  the first and second switching elements being operable by the LED segment controller for controlling a path of the LED current flowing through the LED circuit arrangement.

The LED controller controls the path of the LED current flowing through the LED circuit arrangement by operating the first and the second switching element for controlling the path of the current through the first and second LED segments is associated with varying the load of the LED circuit arrangement. The effects of this load variation may be effectively diminished by controlling the converter current period.

In a further embodiment,
  the first switching element is electrically parallel to the first LED segment,
  the second switching element is electrically parallel to the second LED segment, and
  the first and second switching elements are operable by the LED segment controller for selecting the path of the LED current to pass through the LED segment associated with the switching element or to bypass the LED segment associated with the switching element.

When the first switching element is open, the current will flow through the first LED segment. When the first switching element is closed, the current will flow through the first switching element and bypass the first LED segment.

When the second switching element is open, the current will flow through the second LED segment. When the second switching element is closed, the current will flow through the second switching element and bypass the second LED segment.

By operating the first and second switching elements, the path of the LED current is thus selected to pass selectively through the LED segments.

In an embodiment, the LED circuit load detector is in electrical communication with the LED controller and wherein the LED circuit load detector is arranged to cooperate with the LED controller to determine the LED circuit load.

The LED circuit load may thus be directly obtained and used for controlling the converter current period, without the need for an additional measurement on an electrical signal.

The LED driver IC according to the invention comprises one of the circuit arrangements described above.

The LED driver IC may include one or more of the above-mentioned components like inductors, capacitors and/or resistors, but these components may also be external to the IC, and connected to the IC during use to cooperate with the IC. The composition if the external component and the IC may then together form a complete circuit arrangement according to the invention.

In further embodiments, the LED driver IC according to the invention comprises a plurality of any one or more of the circuit arrangements described above, each of the plurality of circuit arrangements being associated with a corresponding LED circuit arrangement.

The LED driver IC is thus operable to regulate a first current with a first mean current level through a first LED circuit arrangement, e.g. comprising a red and an amber LED, and a second current with a second mean current level through a second LED circuit arrangement, e.g. comprising a green and a blue LED.

The first and the second mean current level may be different, e.g. to accommodate for the different physical structure of a first class of red and amber LEDs compared to a second class of green and blue LEDs.

The circuit arrangements in the plurality of any one or more of the circuit arrangements may be of the same type, but may alternatively be of different types. E.g., a LED driver IC with two circuit arrangements may comprise a first and a second circuit arrangement, each comprising a switch-mode converter according to a Buck topology. Alternatively, a LED driver IC with two circuit arrangements may, e.g. comprise a first circuit arrangement comprising a switch-mode converter according to a Buck topology and a second circuit arrangement comprising a switch-mode converter according to a Buck-Boost topology.

The invention further provides a circuit composition comprising:
  a first arrangement selected from the group consisting of a LED circuit arrangement and a LED driver IC, as described above, and
  a LED circuit arrangement including at least one LED,
wherein the first arrangement is in electrical communication with the LED circuit arrangement for regulating a LED current flowing through the LED circuit arrangement.

The circuit composition has the advantageous behaviour that the LED current is regulated with a well-controlled mean current level and well-controlled converter current period.

In an embodiment of the circuit composition, the LED circuit arrangement comprises a first LED segment and a second LED segment, the first LED segment being associated with a first switching element operable for controlling a path of the LED current through the first LED segment, the second LED segment being associated with a second switching element operable for controlling a path of the LED current through the second LED segment,
  the first and second switching elements being operable by the LED segment controller for controlling a path of the LED current flowing through the LED circuit arrangement.

In a further embodiment of the circuit composition,
  the first switching element is electrically parallel to the first LED segment,
  the second switching element is electrically parallel to the second LED segment, and
  the first and second switching elements being operable by the LED segment controller for selecting the path of the LED current to pass through the LED segment associated with the switching element or to bypass the LED segment associated with the switching element.

A further embodiment of the invention relates to a LED lighting system comprising a LED circuit arrangement including at least one LED and one of the circuit arrangements described above.

The LED lighting system may comprise any one of the circuit compositions described above.

The LED lighting system may be a brightness controlled LED-lamp, a color-variable LED lamp, a LED matrix light source, a LED matrix display, a large-sized LED information display for advertisement or moving images, a LED-backlight for a LCD-TV, a LED-backlight for a LCD-monitor, or any other lighting system in which the current level of the LED current through at least one LED may be regulated in accordance with aspects of the present invention as described above.

BRIEF DESCRIPTION OF DRAWINGS

The above and other aspects of the invention will be further elucidated and described in detail with reference to the drawings, in which corresponding reference symbols indicate corresponding parts:

FIG. 1a schematically shows a circuit arrangement according to the prior art, supplying a current to a fixed LED arrangement; FIG. 1b shows electrical signals related to the circuit arrangement of FIG. 1a;

FIG. 2 schematically shows the circuit arrangement according to the prior art, supplying a current to a switchable LED arrangement;

FIG. 6b shows electrical signals related to the embodiment of FIG. 6a.

FIG. 16 shows an alternative circuit composition comprising a LED driver IC and a LED circuit arrangement according to the invention;

FIG. 17 shows an embodiment of a LED lighting system according to the invention.

DETAILED DESCRIPTION

Figure 3:
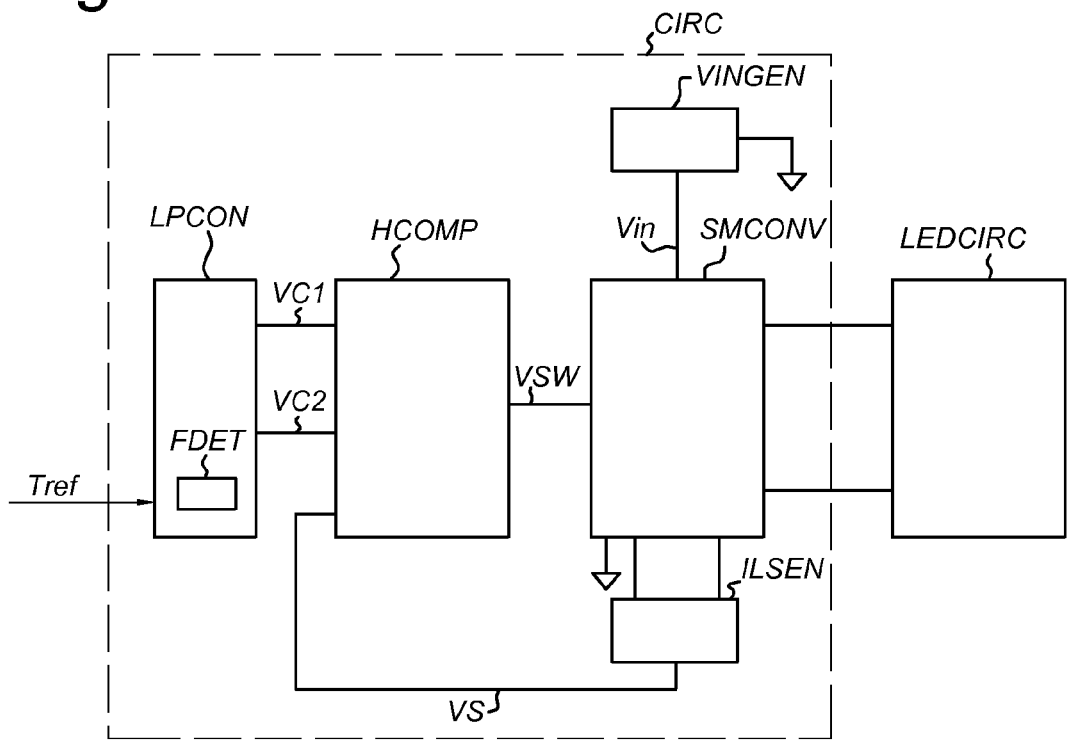
FIG. 3 schematically shows a block diagram of an embodiment of a circuit arrangement according to the invention.

FIG. 1a schematically shows a circuit arrangement CIRC according to the prior art, supplying a current to a fixed LED arrangement LEDCIRC. FIG. 1b shows electrical signals related to the circuit arrangement CIRC shown in FIG. 1a.

The circuit is arranged for regulating a mean current level of a LED current ILED flowing through a LED arrangement LEDCIRC. In the example shown, the LED arrangement LEDCIRC is a series arrangement of a first light emitting diode LED1 and a second light emitting diode LED2. The example shown uses a so-called hysteretic Buck-converter, in which the full converter current IL flowing through the circuit arrangement is fed to the LED circuit arrangement as the LED current ILED.

The circuit arrangement has a converter current sensor ILSEN. The converter current sensor includes a sense resistor RS, which is arranged to conduct the converter current IS. The voltage drop over the sense resistor RS is representative of the current level of the converter current IL. The voltage drop will be further referred to as the converter current sensing voltage VS.

The circuit arrangement further comprises a hysteretic comparator HCOMP and a switch-mode converter SMCONV. The hysteretic comparator HCOMP can establish an upper trip voltage VH and a lower trip voltage VL as control crossover thresholds. The upper trip voltage VH is associated with a peak current level ILH of the converter current IL and the lower trip voltage VL is associated with a valley current level ILL of the converter current IL. The mean current level ILAVE is an average of the peak current level ILH and the valley current level of the converter current ILL. The hysteretic comparator HCOMP is in electrical communication with the converter current sensor ILSEN to receive the converter current sensing voltage VS.

The converter current sensing voltage VS is connected to an inverting input of a comparator CMP. The non-inverting input of the comparator CMP is connected via a multiplexer MUX to either the lower trip voltage VL or the upper trip voltage VH. Feedback from the output of the comparator CMP to the multiplexer MUX selects either the lower trip voltage VL or the upper trip voltage VH. In response to each crossover of the lower trip voltage VL by the converter current sensing voltage VS in a negative direction, the comparator CMP and hysteretic comparator HCOMP thus output a switching control voltage VSW at a first logic LHL. In response to each crossover of the upper trip voltage VH by the converter current sensing voltage VS in a positive direction, the comparator CMP and the hysteretic comparator HCOMP output the switching control voltage VSW at a second logic level LLL.

The switch-mode converter SMCONV is operable to control a flow of the LED current ILED through the LED circuit arrangement LEDCIRC by controlling a flow of the converter current IL through the circuit arrangement CIRC. The switch-mode converter SMCONV is in electrical communication with the hysteretic comparator HCOMP to receive the switching control voltage VSW.

In response to the switching control voltage VSW equalling the first logic level LHL, the switch-mode converter SMCONV controls an increase of the converter current IL from the valley current level to the peak current level. This controlling of the increase of the converter current IL will continue for a time duration which will be further referred to as an increase time duration TH. In response to the switching control voltage VSW equalling the second logic level, the switch-mode converter SMCONV controls a decrease of the converter current IL from the peak current level to the valley current level. This controlling of the decrease of the converter current IL will continue for a time duration which will be further referred to as a decrease time duration TL.

The circuit arrangement CIRC will thus supply the LED circuit arrangement LEDCIRC with a LED current at the mean current level. The LED current oscillates with a converter current period T between a valley current level and a peak current level. The converter current period T comprises the increase time duration TH and the decrease time duration TL. The valley current level and the peak current level are dependent on the upper trip voltage VH and the lower trip voltage VL respectively. The difference between the peak current level and the valley current level will be further referred to as a peak-to-peak current ripple dI. The mean current level is dependent on the mean voltage level of the upper trip voltage VH and the lower trip voltage VL, referred to as a reference voltage level VREF. The difference between the upper trip voltage VH and the lower trip voltage VL will be referred to as the hysteresis voltage VHYS. The increase time duration TH, the decrease time duration TL and hence also the converter current period T, depend on these voltages and may be further dependent on, e.g. the circuit load of the LED circuit.

The switch-mode converter comprises a switch SW1, a diode D2 and an inductor L1. The inductor L1 is connected between an intermediate node LX, located in between the switch SW1 and the diode D2, and the LED circuit arrangement LEDCIRC. The switch SW1 and the diode D2 switch the LX node to an input voltage Vin, supplied by an external DC power supply, or to ground GND, depending on the state of the switch SW1. Switching the LX node to the input voltage Vin or to ground GND respectively charges and discharges the inductor L1 and consequently increases or decreases the current level of the converter current IL.

This class of circuit arrangements CIRC will be referred to as examples of hysteretic converters. The specific switch-mode converter described here will be referred to as an example of a converter according to a so-called Buck-converter topology. Alternative converter topologies may also be feasible within the scope of the invention. As an example, also an alternative hysteretic converter, such as a so-called hysteretic Buck-Boost-converter, or a so-called hysteretic Boost-converter may be used in embodiments of the invention.

FIG. 2 schematically shows the circuit arrangement CIRC according to the prior art, supplying a current to a switchable LED circuit arrangement LEDCIRC.

The circuit arrangement CIRC may be the same as described in reference with FIG. 1. The LED circuit arrangement LEDCIRC however comprises a first LED LED1 and a second LED LED2, each associated with a respective switching element B1, B2. The first switching element B1 is electrically parallel to the first LED LED1 and the second switching element B2 is electrically parallel to the second LED LED2. The first and second switching elements B1, B2 are each operable by a LED segment controller PWMCON for selecting the path of the LED current to pass through the LED associated with the respective switching element or to bypass the LED associated with the respective switching element. The LED arrangement thus allows to vary the effective light output of each of the two LEDs individually, by varying the time that the path of the LED current passes through a LED with a duty cycle of a control period. The control period is generally a period of a fixed length, also referred to as a pulse width modulation period corresponding to a pulse width modulation frequency. The duty cycle associated with operating the first LED LED1 to emit light is further referred to as the first LED duty cycle PWM1. The duty cycle associated with operating the second LED LED2 to emit light is further referred to as the second LED duty cycle PWM2.

It should be noted that in stead of a single LED, also, e.g. a plurality of LEDs arranged in series may be used and operated by a single switching element in parallel to the series arrangement of the plurality of LEDs. This may also be referred to as a LED segment. The LEDs from the plurality of LEDs in a single LED segment may have substantially the same colour, but the colours may also be different between the LEDs within a segment. When referring to "LED" in the following, it shall be understood to also refer to embodiments using a "LED segment" comprising a plurality of LEDs.

When the two LEDs LED1, LED2 are operated with duty cycles PWM1, PWM2 using the switches B1, B2, the circuit load of the LED circuit arrangement will differ as a consequence of the different voltage drop VLED over the LED circuit arrangement depending on which switch is open and which is closed. The hysteretic converter will however maintain the mean current level as the same value, due to the operating mechanism described above in reference with FIG. 1. However, in doing so, the LED current frequency—or the LED current period or the, for this converter type equivalent, converter current period—of the oscillation of the LED current will differ.

For the circuit arrangement shown, the mean current of the LED current ILED may be described in terms of the upper trip voltage VH, the lower trip voltage VL and the sense resistor value RS as:

$$ILED = (VH + VL)/(2 \cdot RS) \quad (1)$$

The peak-to-peak ripple dI of the LED current is given by the difference between the upper trip voltage VH and the lower trip voltage VL and the sense resistor value RS:

$$dI = (VH - VL)/RS \quad (2)$$

The charge and discharge rate $dI/dt_c$ and $dI/dt_d$ of the inductor L1 with an inductive value L is determined by the supply voltage Vin and the load voltage VLED in the following way:

$$\text{Charging: } dI/dt_c = (Vin - VLED)/L \quad (3)$$

$$\text{Discharging: } dI/dt_d = -VLED/L \quad (4)$$

Consequently, the LED current control period T, being the sum of the charging time $t_c$ and the discharging time $t_d$, or the sum of the increase time duration TH and the decrease time duration TL, is given by:

$$T = TH + TL = t_c + t_d = L \cdot dI/(Vin - VLED) + L \cdot dI/Vled = L \cdot (VH - VL)/(RS \cdot (Vin - VLED)) + L \cdot (VH - VL)/(RS \cdot VLED) \quad (5)$$

From (5) it can be seen that the LED current frequency f=1/T varies considerably with varying load voltage VLED, having its maximum at VLED=Vin/2 and its minima at VLED close to 0 and VLED close to Vin (determined by possible further resistances in the charge and discharge path, which are ignored in the formulas above).

In this example with two bypass switches four states will occur for the load voltage VLED. Expressing the voltage over the first LED1 with a first LED voltage VLED1 and the voltage over the second LED2 with a second voltage VLED2, and ignoring the voltage drop over a closed (conducting) switch B1, B2, the four load voltages are:

both switches B1, B2 off: VLED=VS+VLED1+VLED2;

only switch B1 on; switch B2 off: VLED=VS+VLED2;

only switch B2 on; switch B2 off: VLED=VS+VLED1;

both switches B1, B2 on: VLED=VS.

This results in four different frequencies when using a circuit arrangement CIRC according to the prior art. Of these frequencies, three frequencies are associated with conditions during which at least one LED emits light. For all four frequencies, the mean current level is substantially constant.

FIG. 3 schematically shows a block diagram of an embodiment of a circuit arrangement CIRC according to the invention, in electrical communication with a led circuit arrangement LEDCIRC. Details of the different elements of the circuit arrangement CIRC and the LED circuit arrangement LEDCIRC are not drawn, but will be described for different embodiments further below.

In FIG. 3, the circuit arrangement comprises a converter current sensor ILSEN, a hysteretic comparator HCOMP, a switch-mode converter SMCONV, a converter current period controller LPCON and a power supply VINGEN.

The converter current sensor ILSEN may be of the type described in reference with FIG. 1, and is in electrical communication with at least the hysteretic comparator HCOMP, the switch-mode converter SMCONV and the converter current period controller LPCON.

The switch-mode converter SMCONV may be of the type described in reference with FIG. 1, and is in electrical communication with at least the converter current sensor ILSEN to receive the converter current IL, the hysteretic comparator HCOMP to receive a switching control voltage VSW and, the power supply VINGEN to receive the input voltage Vin.

The hysteretic comparator HCOMP is in electrical communication with the switch-mode converter SMCONV and the converter current period controller LPCON. The hysteretic comparator HCOMP is arranged to receive a first trip control voltage VC1 and a second trip control voltage VC2 from the converter current period controller LPCON. The hysteretic comparator HCOMP is operable to establish the upper trip voltage VH and the lower trip voltage VL from the first trip control voltage VC1 and the second trip control voltage VC2. The hysteretic comparator HCOMP may further operate like the hysteretic comparator HCOMP described in reference with FIG. 1, and is thus operable to output a switching control voltage VSW to the switch-mode converter SMCONV.

The converter current period controller LPCON is a new and inventive element to the circuit arrangement according to the invention. The converter current period controller LPCON is operable to control a converter current period T to be within a period control range Tref.

The period control range Tref may be defined with a lower period threshold TrefL (not shown) and an upper period threshold TrefH (not shown). The converter current period T may then be controlled to be between the lower period threshold TrefL and the upper period threshold TrefH.

The lower period threshold TrefL and the upper period threshold TrefH may be determined from a centre duration and a duration width. The converter current period T may then be controlled to be within the duration width around the centre duration. The duration width is preferably smaller than 10% of the centre duration, such that the converter current period T varies with only a small fraction, i.e. with less than 10%. In an example, the centre duration corresponds to the period of a frequency of 1 MHz and the duration width is 100 kHz, resulting in a lower period threshold TrefL associated with a frequency of 0.95 MHz and an upper period threshold TrefH associated with a frequency of 1.05 MHz. In this example, the centre duration has a fixed value, but the centre duration may also be varied real-time over a spectral band.

The converter current period controller LPCON may comprise a converter current period detector FDET operable to establish an indicator IND associated with the converter current period T. The indicator IND may be a measurement value of the converter current period, an estimate of the converter current period, or any other indicator that can be used to establish a suitable first and second trip control voltage for controlling the converter current period.

In establishing the indicator IND, a plurality of indicator values may be acquired and filtered in order to obtain the indicator IND. The filtering may comprise a low-pass filtering in order to reduce the sensitivity to high-frequent fluctuations, e.g. due to noise or effects of quantization, on the acquired indicator values.

Figure 4A:
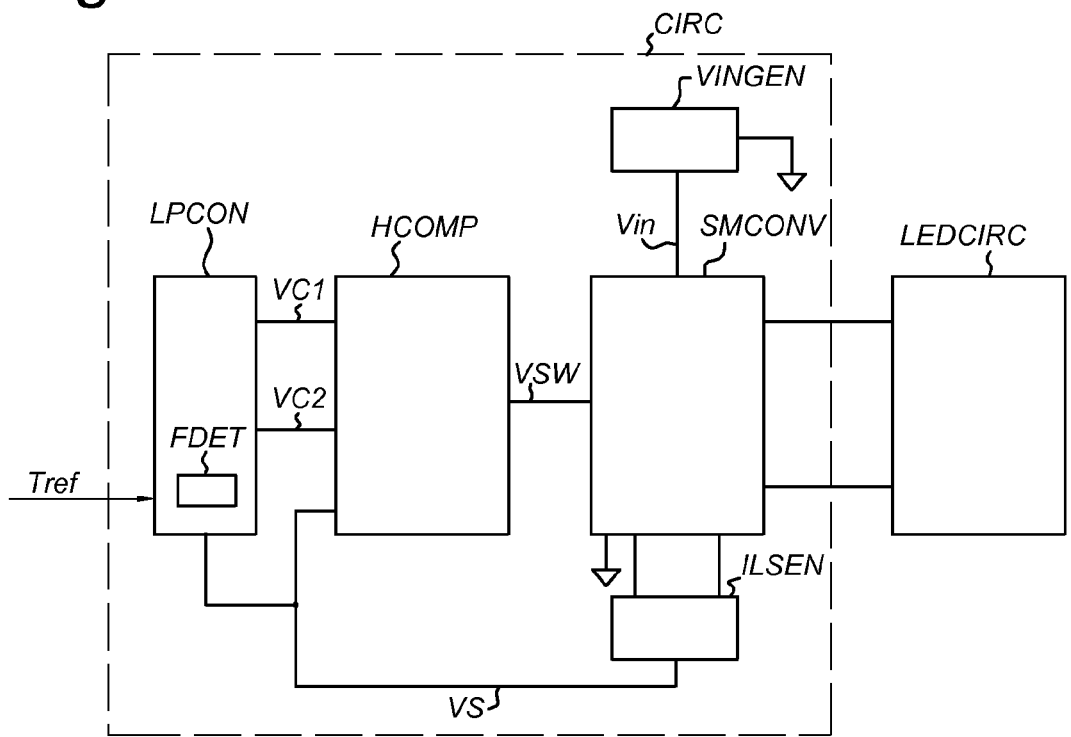
FIGS. 4a-4c schematically show block diagrams of embodiments of circuit arrangements according to the invention.

As shown in FIG. 4a, the converter current period detector FDET may be in electrical communication with the converter current sensor ILSEN to receive the converter current sensing voltage VS. The converter current period detector FDET may measure a value of the converter current period from the current sensing voltage VS, and establish the indicator IND from this measurement. A suitable first trip control voltage VC1 and second trip control voltage VC2 are then derived from this indicator IND.

Figure 4B:
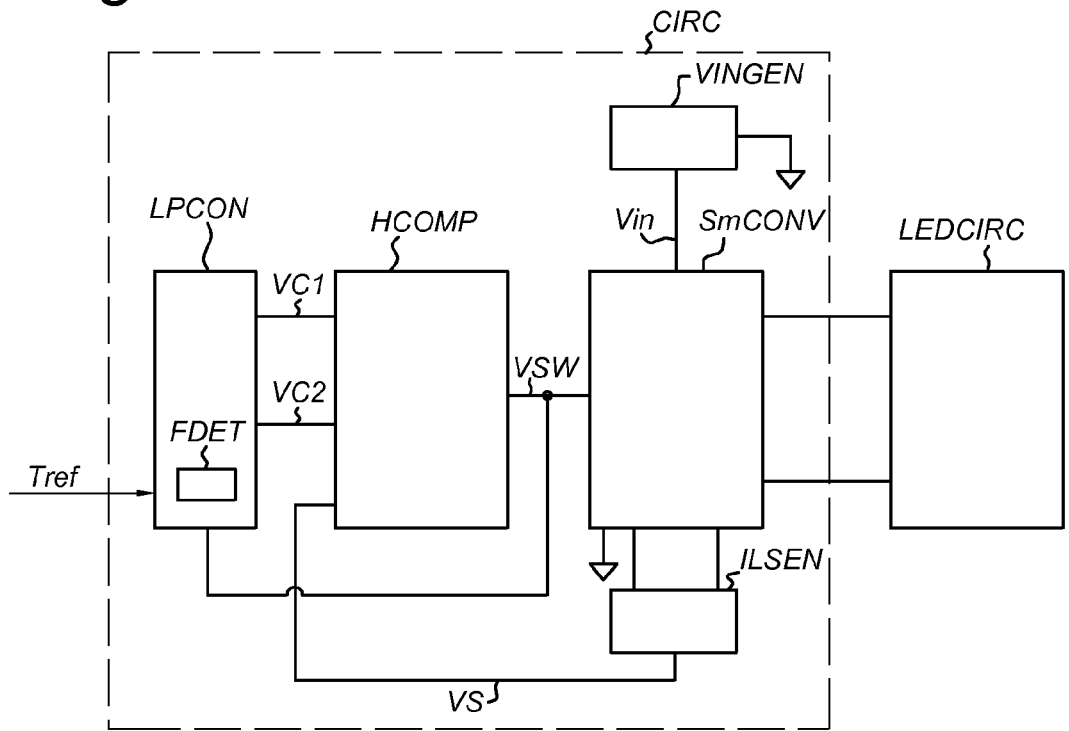

As shown in FIG. 4b, the converter current period detector FDET may be in electrical communication with the hysteretic comparator HCOMP to receive the switching control voltage VSW. The converter current period detector FDET may measure a value of the converter current period from the switching control voltage VSW, and establish the indicator IND from this measurement. A suitable first VC1 and second trip control voltage VC2 are then derived from this indicator IND.

Figure 4C:
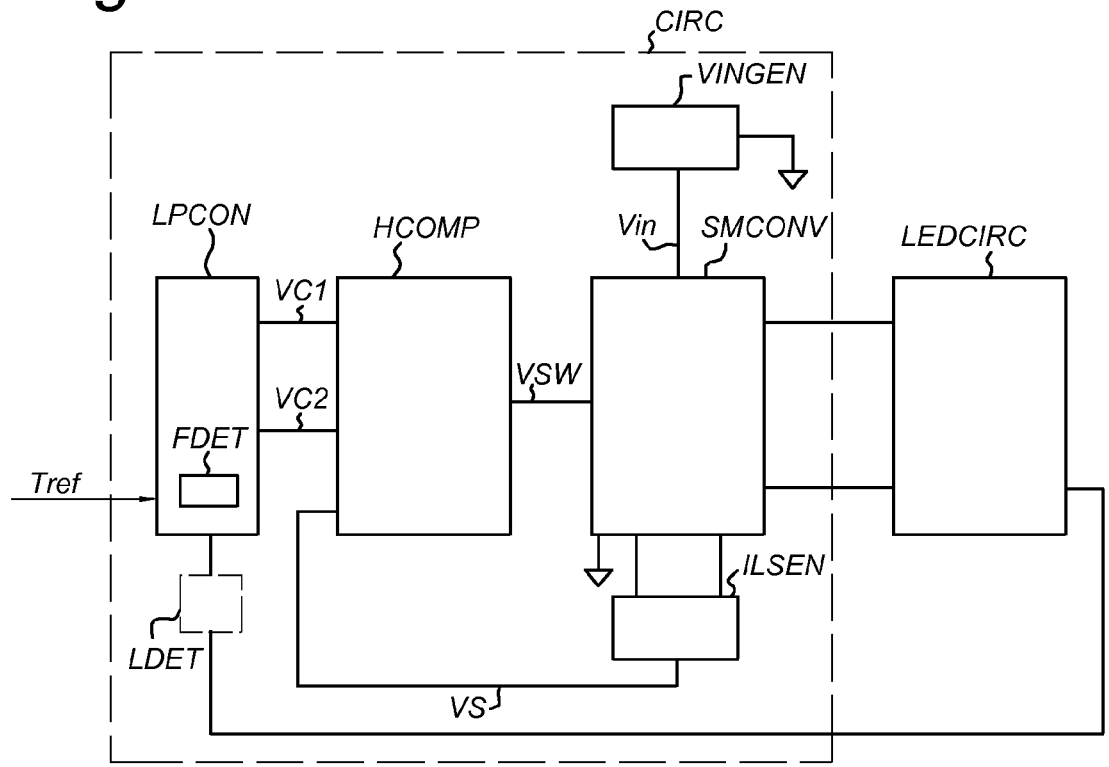

As shown in FIG. 4c, the converter current period detector FDET may be in electrical communication with a LED circuit load detector (LDET) to receive a LED circuit load. The LED circuit load detector (LDET) may be in electrical communication with the LED circuit arrangement LEDCIRC. The converter current period detector FDET may estimate a value of the converter current period T from the LED circuit load, and establish the indicator IND from this estimation. A suitable first VC1 and second trip control voltage VC2 are then derived from this indicator IND. The converter current period detector FDET may alternatively directly use the LED circuit load as the indicator IND, and use the indicator IND e.g. for a look-up in a look-up table in order to retrieve a suitable first VC1 and second trip control voltage VC2. E.g., when the LED circuit load is expressed as the status of the switching elements B1, B2, the status of the switching elements B1, B2 can be used for retrieval from the look-up table.

Figure 5A:
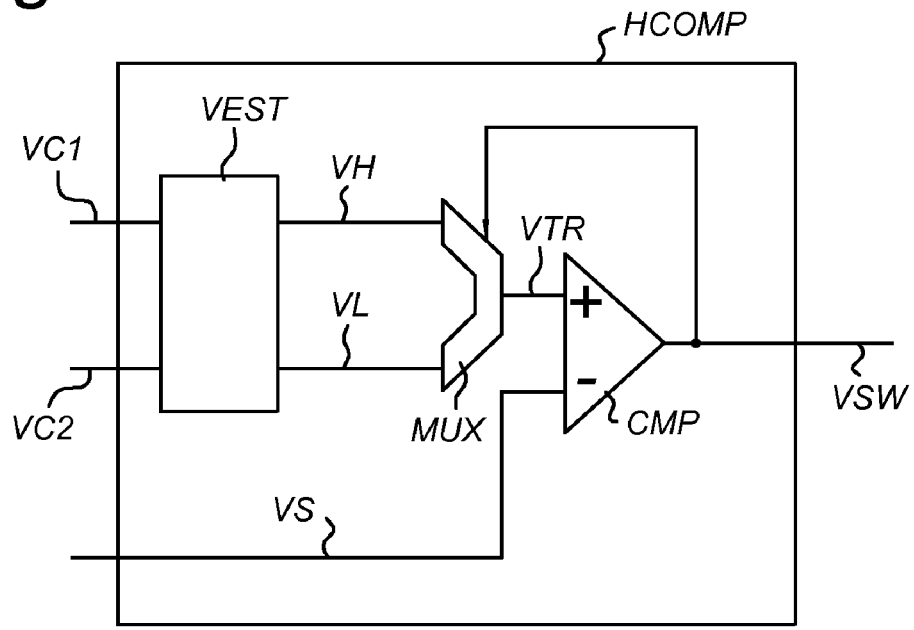
FIGS. 5a and 5b show exemplary embodiments of a hysteretic comparator usable in embodiments of a circuit arrangement according to the invention.
Figure 5B:
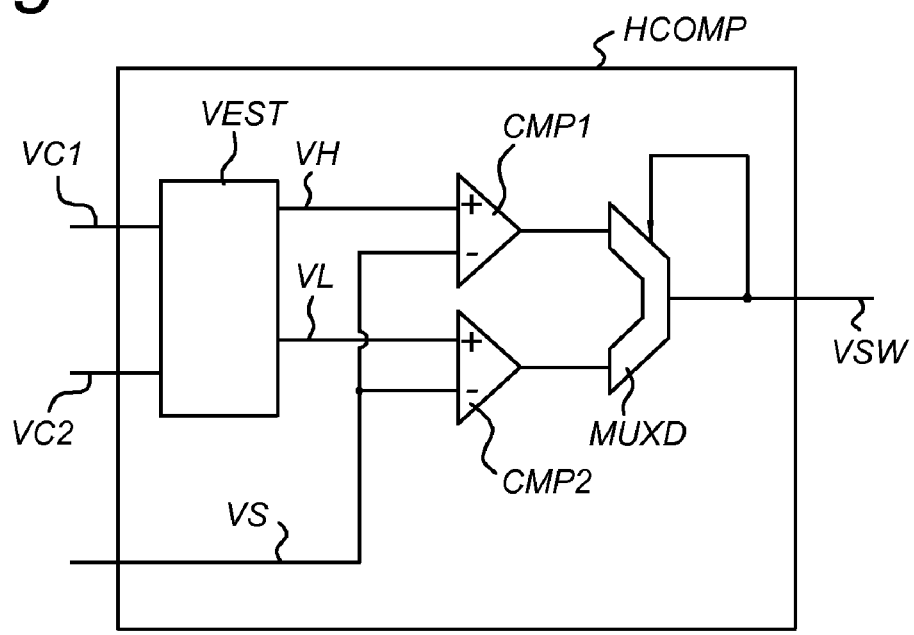

FIGS. 5a and 5b show exemplary embodiments of the hysteretic comparator HCOMP being a part of an embodiment of a circuit arrangement CIRC according to the invention. The hysteretic comparator HCOMP is operable to receive the first and second trip control voltages VC1, VC2 from the converter current period detector FDET in a voltage establishing unit VEST. The voltage establishing unit VEST is operable to establish the upper and lower trip voltages VH, VL in response to the first and second trip control voltages VC1, VC2.

The first and second trip control voltages VC1, VC2 may be the upper trip voltage and lower trip voltage required to be applied for controlling the converter current period to be within the period control range Tref. The hysteretic comparator HCOMP may then use the first and second trip control voltages VC1, VC2 as the new upper and lower trip voltages VH, VL.

Alternatively, the first and second trip control voltages VC1, VC2 may be adjustment values to the upper and lower trip voltages VH, VL as being applied. The hysteretic comparator HCOMP may then add the first and second trip control voltages VC1, VC2 to the upper and lower trip voltages VH, VL to obtain new upper and lower trip voltages VH, VL.

In a first embodiment shown in FIG. 5a, the non-inverting input of a first comparator CMP1 is connected to the upper trip voltage VH and the non-inverting input of a second comparator CMP2 is connected to the lower trip voltage VL or the upper trip voltage VH. The converter current sensing voltage VS is connected to the inverting input of the first comparator CMP1 and to the inverting input of the second comparator CMP2. The output of the first comparator CMP1 and the output of the second comparator CMP2 are fed into a digital multiplexer MUXD. Feedback from the output of the digital multiplexer MUXD to the digital multiplexer MUXD selects output of the first comparator CMP1 and the output of the second comparator CMP2 as the switching control voltage VSW on the output of the digital multiplexer MUXD. It will be clear to a person skilled in the art that the selection performed by the digital multiplexer MUXD may alternatively be implemented using alternative electrical components, e.g. a flip-flop. In response to each crossover of the lower trip voltage VL by the converter current sensing voltage VS in a negative direction, the hysteretic comparator HCOMP thus outputs the switching control voltage VSW at a first logic LHL. In response to each crossover of the upper trip voltage VH by the converter current sensing voltage VS in a positive direction, the hysteretic comparator HCOMP output the switching control voltage VSW at a second logic level LLL.

In a second embodiment shown in FIG. 5b, the non-inverting input of a comparator CMP is connected via a multiplexer MUX to either the lower trip voltage VL or the upper trip voltage VH. This hysteretic comparator construction has the advantage first that there is only one comparator offset error contribution, whereas the construction of FIG. 5a has two likely different comparator offset error contributions from each of the two comparators. Moreover, the comparator offset is in the same direction both for VH and VL yielding an inherent accurate hysterese window VH–VL, as the comparator offset effectively cancels out in the difference VH–VL. The converter current sensing voltage VS is connected to an inverting input of the comparator CMP. Feedback from the output of the comparator CMP to the multiplexer MUX selects either the lower trip voltage VL or the upper trip voltage VH as a trip voltage VTR on the output of the multiplexer MUX. In response to each crossover of the lower trip voltage VL by the converter current sensing voltage VS in a negative direction, the comparator CMP and hysteretic comparator HCOMP output a switching control voltage VSW at a first logic LHL. In response to each crossover of the upper trip voltage VH by the converter current sensing voltage VS in a positive direction, the comparator CMP and the hysteretic comparator HCOMP output the switching control voltage VSW at a second logic level LLL.

FIGS. 6a-6d show exemplary embodiments of switch-mode converters of the Buck-converter type and the associated converter current sensor as used in embodiments of a circuit arrangement according to the invention. FIGS. 6a-6d further show exemplary and non-limiting embodiments of a LED circuit arrangement fed by the switch-mode converter.

Figure 6A:
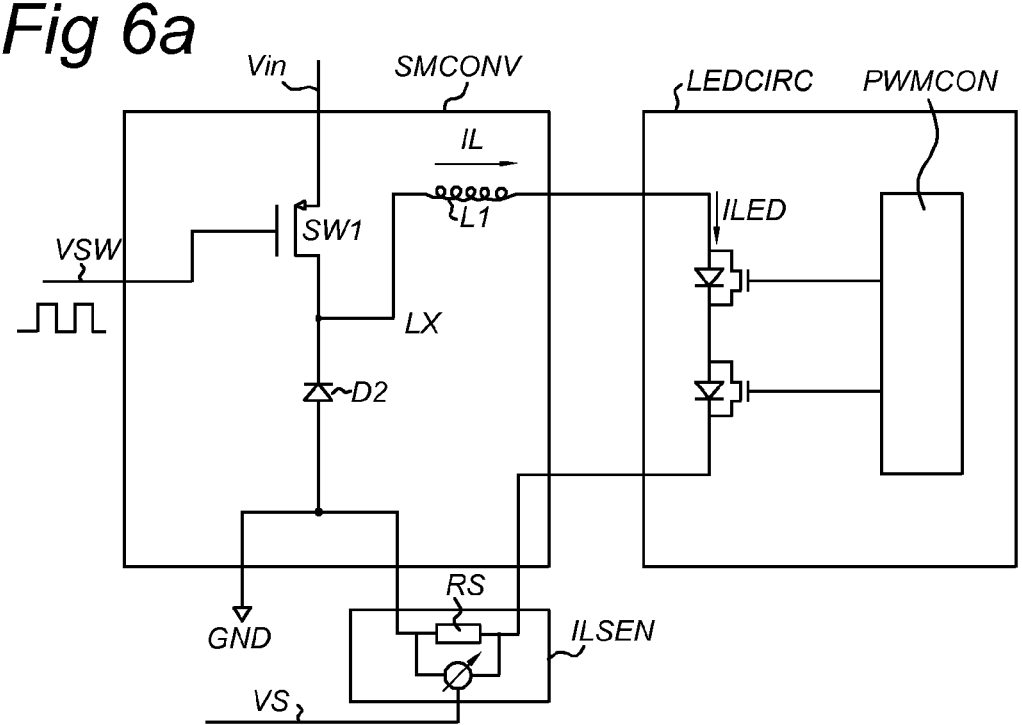
FIG. 6a and FIGS. 6c-6e show exemplary embodiments of switch-mode converters of the Buck-converter type and the associated converter current sensor usable in embodiments of a circuit arrangement according to the invention, electrically connected to an exemplary embodiment of a LED circuit arrangement.

The switch-mode converter SMCONV shown in FIG. 6a includes a switch SW1, a diode D2 and an inductor L1. The switch-mode converter SMCONV is similar to the one described in reference to FIG. 1. The inductor L1 is connected between an intermediate node LX, located in between the switch SW1 and the diode D2, and the LED circuit arrangement LEDCIRC. The switch SW1 and the diode D2 switch the LX node to an input voltage Vin, supplied by an external DC power supply, or to ground GND, depending on the state of the switch SW1. Switching the LX node to the input voltage Vin or to ground GND respectively charges and discharges the inductor L1 and consequently increases or decreases the current level of the converter current IL.

Figure 6B:
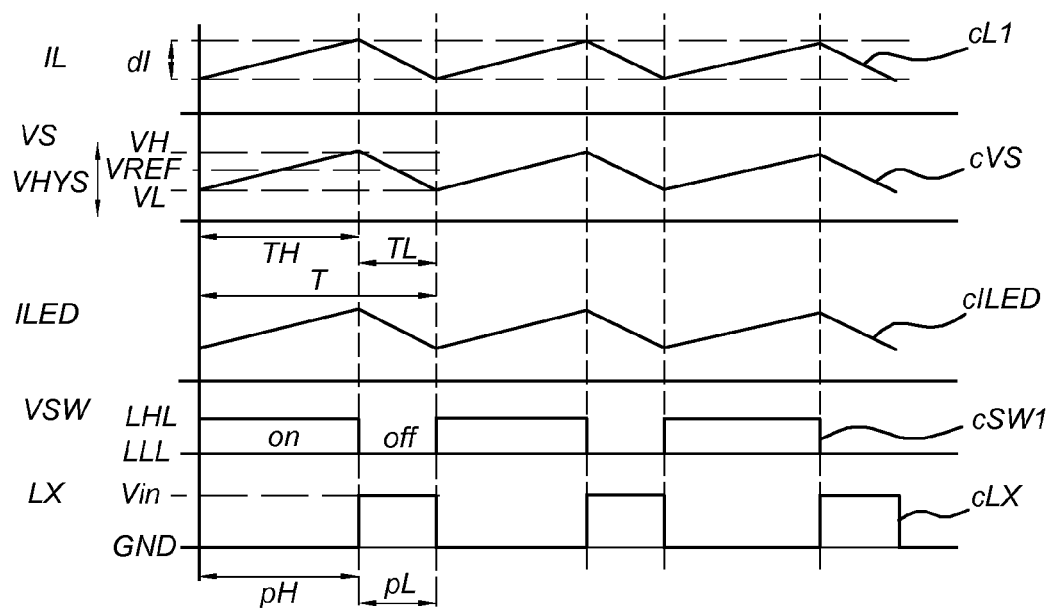

FIG. 6b shows electrical signals related to the embodiment of FIG. 6a. Curve cL1 shows the converter current IL as a function of time, i.e. the current through the inductor L1 and through the sense resistor RS. Curve cVS shows the current sensing voltage VS as a function of time. Curve cILED shows the LED current ILED as a function of time, i.e. the current flowing through the LEDs (when the associated bypass switch in the LED circuit arrangement is open). Curve cSW1 shows the switching control voltage VSW, which can take a high logic level LHL corresponding to a closed switch SW1 or a low logic level LLL corresponding to an open switch SW1. Curve cLX shows the voltage at node LX, which can take a low value corresponding to ground or a high value corresponding to the input voltage Vin.

The switch-mode converter SMCONV is operable to control a flow of the LED current ILED with a mean current level through the LED circuit arrangement LEDCIRC. The switch-mode converter SMCONV is in electrical communication with the hysteretic comparator HCOMP to receive the switching control voltage VSW.

In response to the switching control voltage VSW equaling the first logic level LHL, the switch-mode converter SMCONV controls an increase of the converter current IL from the valley current level to the peak current level, as is shown in FIG. 6b. This controlling of the increase of the converter current will continue for a time duration which will be further referred to as an increase time duration TH. This phase of controlling may be further referred to as a increase phase pH. In response to the switching control voltage VSW equaling the second logic level, the switch-mode converter SMCONV controls a decrease of the converter current IL from the peak current level to the valley current level. This controlling of the decrease of the converter current will continue for a time duration which will be further referred to as a decrease time duration TL. This phase of controlling may be further referred to as a decrease phase pL.

The circuit arrangement CIRC will thus supply the LED circuit arrangement LEDCIRC with a LED current at the mean current level, which oscillates with a converter current period T between a valley current level and a peak current level. The valley current level and the peak current level are dependent on the upper trip voltage VH and the lower trip voltage VL respectively. The difference between the peak current level and the valley current level will be further referred to as a peak-to-peak current ripple dI. The mean current level is dependent on the mean voltage level of the upper trip voltage VH and the lower trip voltage VL, referred to as a reference voltage level VREF. The difference between the upper trip voltage VH and the lower trip voltage VL will be referred to as the hysteresis voltage VHYS. The increase time duration TH, the decrease time duration TL and hence also the converter current period T, depend on these voltages and may be further dependent on, e.g. the circuit load of the LED circuit.

The converter current sensor ILSEN shown in FIG. 6a comprises a sense resistor RS in the current path of the converter current IL and is operable to perform a voltage measurement over the sense resistor RS. The measured voltage may be outputted as the converter current sensing voltage VS.

Figure 6C:
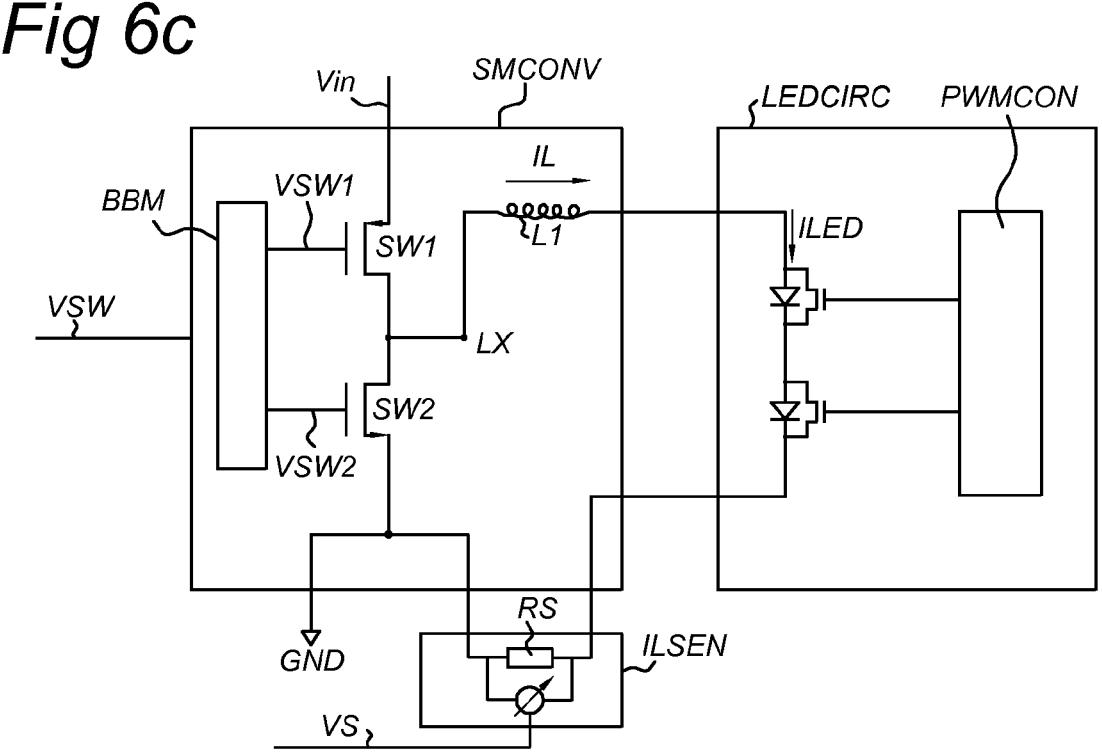

The switch-mode converter SMCONV shown in FIG. 6c includes a switch SW1, a second switch SW2 and an inductor L1. The inductor L1 is connected between an intermediate node LX, located in between the switch SW1 and the second switch SW2, and the LED circuit arrangement LEDCIRC. The switch SW1 and the second switch SW2 switch the LX node to an input voltage Vin, supplied by an external DC power supply, or to ground GND, depending on the state of the switch SW1 and SW2. Switching the LX node to the input voltage Vin or to ground GND respectively charges and discharges the inductor L1 and consequently increases or decreases the current level of the converter current IL.

The switch-mode converter SMCONV is in electrical communication with the hysteretic comparator HCOMP to receive the switching control voltage VSW via a break-before-make circuit BBM. The break-before-make circuit BBM comprises a timing circuit which assures that the two switches SW1 and SW2 can not both be closed at the same time, as this would result in a short circuit of the input voltage Vin and the ground voltage. The break-before-make circuit BBM is thus operable to generate a first and a second switching control voltage VSW1, VSW2 from the switching control voltage VSW which operate the switches SW1 and SW2 to never be closed simultaneously.

The converter current sensor ILSEL in FIG. 6c is similar to the one shown in FIG. 6a.

Electrical signals related to the embodiment of FIG. 6c are substantially the same as the electrical signals shown in FIG. 6b in relation with the embodiment of FIG. 6a, and are not drawn again.

Figure 6D:
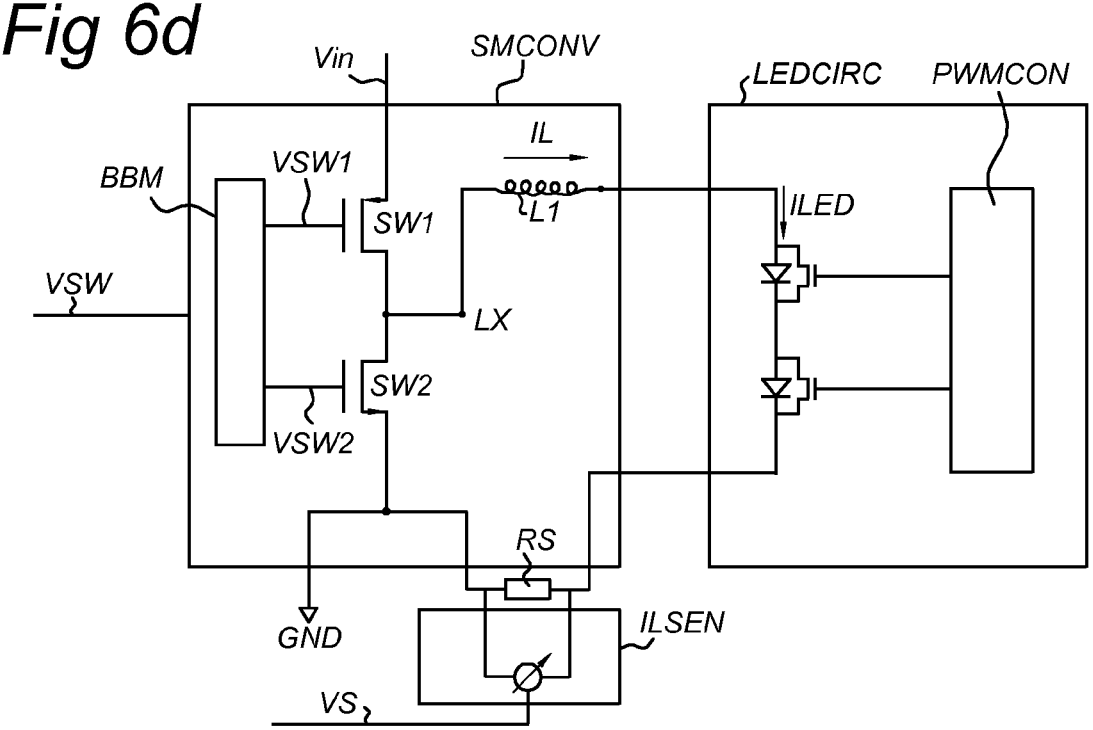

FIG. 6d shows the same switch-mode converter SMCONV as FIG. 6c and an alternative converter current sensor ILSEN.

The sense resistor RS is placed in the current path of the converter current IL, outside the converter current sensor ILSEN. The converter current sensor ILSEN is operable to perform a voltage measurement over the sense resistor RS which is external to the converter current sensor ILSEN. The measured voltage may be outputted as the converter current sensing voltage VS.

An advantage of this embodiment of the converter current sensor ILSEN is that it allows integration of the converter current sensor ILSEN in an integrated circuit, such as a LED driver IC. The value of the sense resistor RS may then be selected independently of the LED driver IC, allowing an wider possibility of selecting the current level that the LED driver IC can support.

Electrical signals related to the embodiment of FIG. 6d are substantially the same as the electrical signals shown in FIG. 6b in relation with the embodiment of FIG. 6a, and are not drawn again.

Figure 6E:
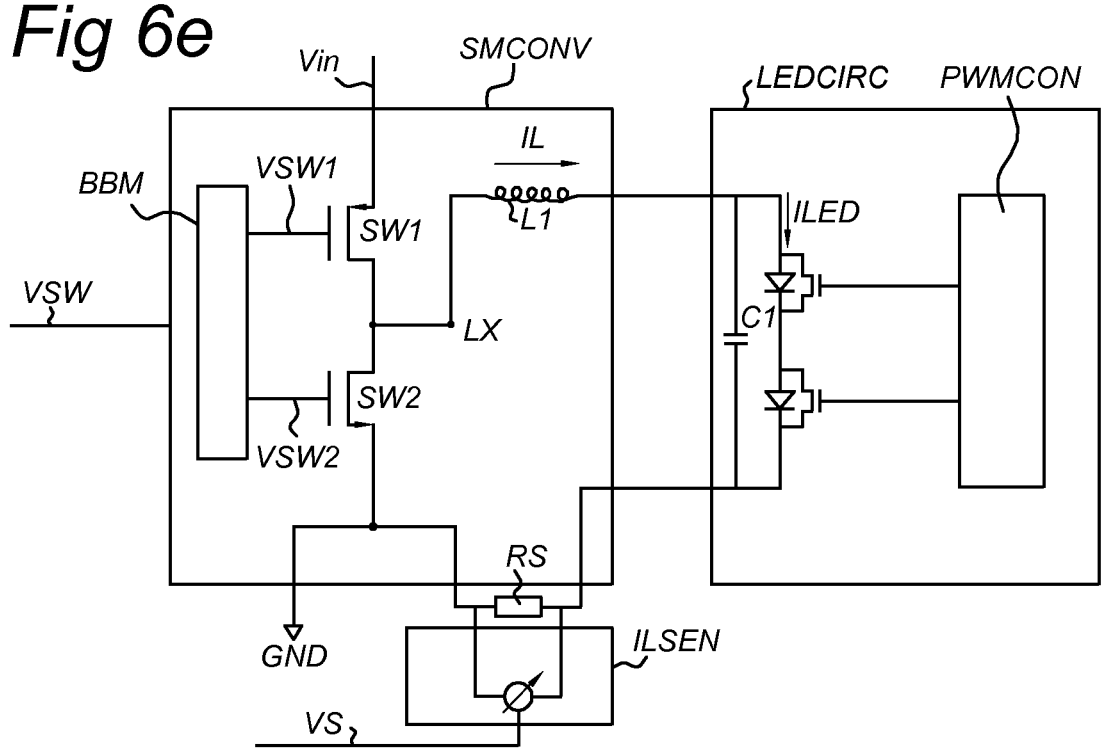

FIG. 6e shows a similar switch-mode converter SMCONV as FIG. 6d cooperating with the same alternative converter current sensor ILSEN as in FIG. 6c.

In FIG. 6e, the LED circuit arrangement LEDCIRC further comprises an capacitive filter C1, connected in parallel to the series circuit of the LED circuit arrangement.

Figure 6F:
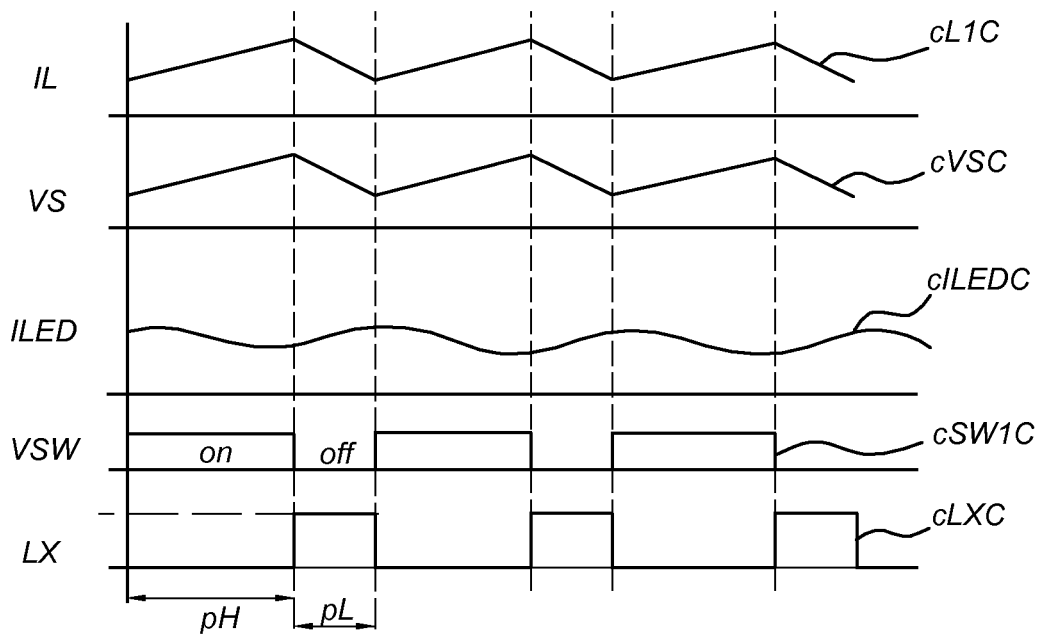
FIG. 6f shows electrical signals related to the embodiment of FIG. 6e.

FIG. 6f shows electrical signals related to the embodiment of FIG. 6e. Curve cL1C shows the converter current IL as a function of time, i.e. the current through the inductor L1 and through the sense resistor RS. Curve cVSC shows the current sensing voltage VS as a function of time. Curve cILEDC shows the LED current as a function of time, i.e. the current flowing through the LEDs (when the associated bypass switch in the LED circuit arrangement is open). Curve cSW1C shows the switching control voltage VSW, which can take a high logic level LHL corresponding to a closed switch SW1 or a low logic level LLL corresponding to an open switch SW1. Curve cLXC shows the voltage at node LX, which can take a low value corresponding to ground or a high value corresponding to the input voltage Vin.

Comparing the curves in FIG. 6f with the curves in FIG. 6b, it can be observed that the capacitive filter C1 provides a smoothing of the LED current amplitude, with the beneficial effects that the lifetime of the LEDs is increased since the peak current level through the LEDs is reduced. Also the ripple amplitude of the LED current is reduced, reducing the ripple amplitude of the light level. Alternatively, with a capacitive filter C1, a larger fluctuation of the converter current can be allowed through the inductor to achieve the same LED current ripple amplitude as for a LED circuit arrangement without a capacitive output filter, which has the advantage of a smaller inductance value and size.

As a Buck-converter type switch-mode converter is not suitable for use with a LED circuit arrangement LEDCIRC which may have a voltage drop VLED over the LED circuit arrangement LEDCIRC that is larger than the input voltage Vin, a Buck-Boost converter topology may be preferred in some situations. The invention can also be applied with switch-mode converters according to a Buck-Boost converter topology.

Figure 7A:
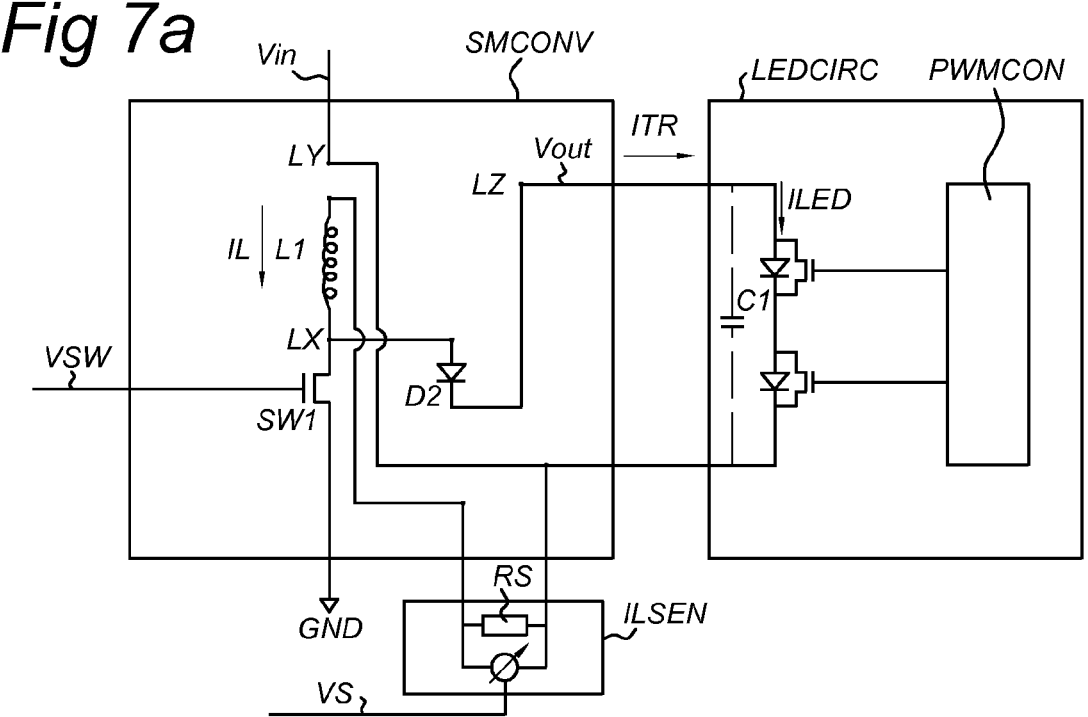
FIGS. 7a and 7d show exemplary embodiments of switch-mode converters of the Buck-Boost converter type, electrically connected to an exemplary embodiment of a LED circuit arrangement.

A first example of such a Buck-Boost switch-mode converters is shown in FIG. 7a.

The switch-mode converter SMCONV shown in FIG. 7a includes a switch SW1, a diode D2 and an inductor L1. The switch-mode converter SMCONV is connected to current sense resistor RS of a converter current sensor ILSEN. The inductor L1 is connected to the input voltage Vin via the current sense resistor RS and an intermediate node LY. The inductor L1 via an intermediate node LX to the switch SW1 which can connect to ground GND. The LED circuit arrangement LEDCIRC is connected to the intermediate node LX via an intermediate node LZ and the diode D2, to the input voltage Vin via a node LY. and to the inductor L1 via node LY and the sense resistor RS of the converter current sensor ILSEN.

An exemplary LED circuit arrangement LEDCIRC is shown with two LEDs in a series arrangement. An optional capacitor C1 may be placed as an capacitive filter between the input and output of the LED circuit arrangement, i.e. in parallel to the series arrangement of the LEDs, to provide a smoothing of the LED current amplitude.

Figure 7B:
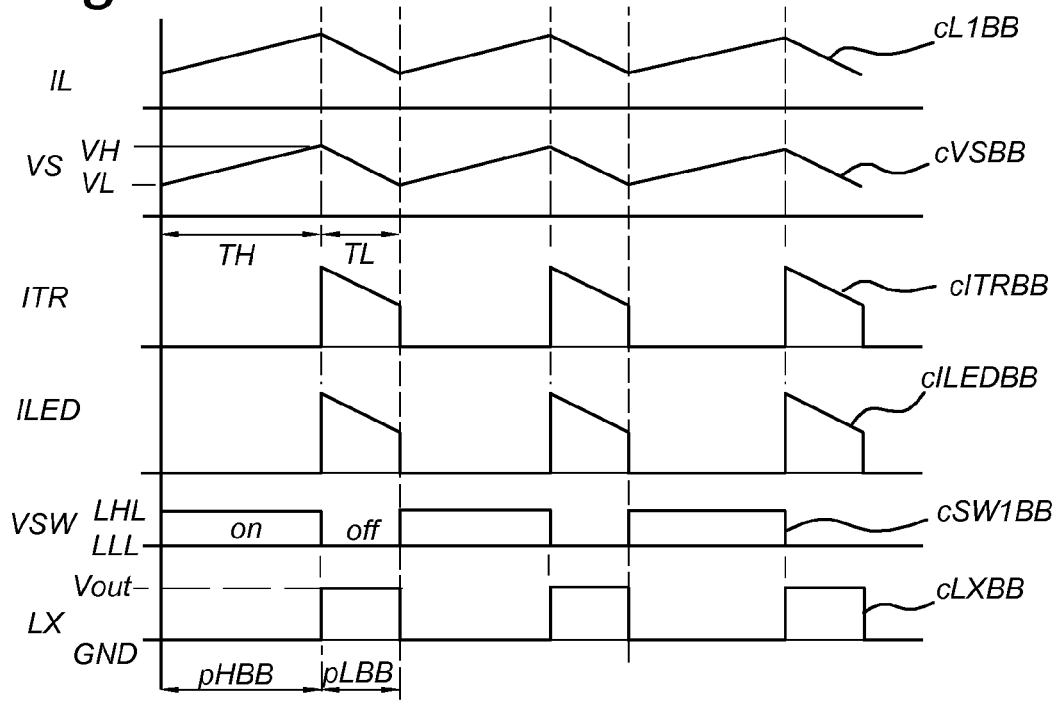
FIGS. 7b and 7c shows electrical signals related to the embodiment of FIG. 7a without and with an optional capacitor in the LED circuit arrangement.
Figure 7C:
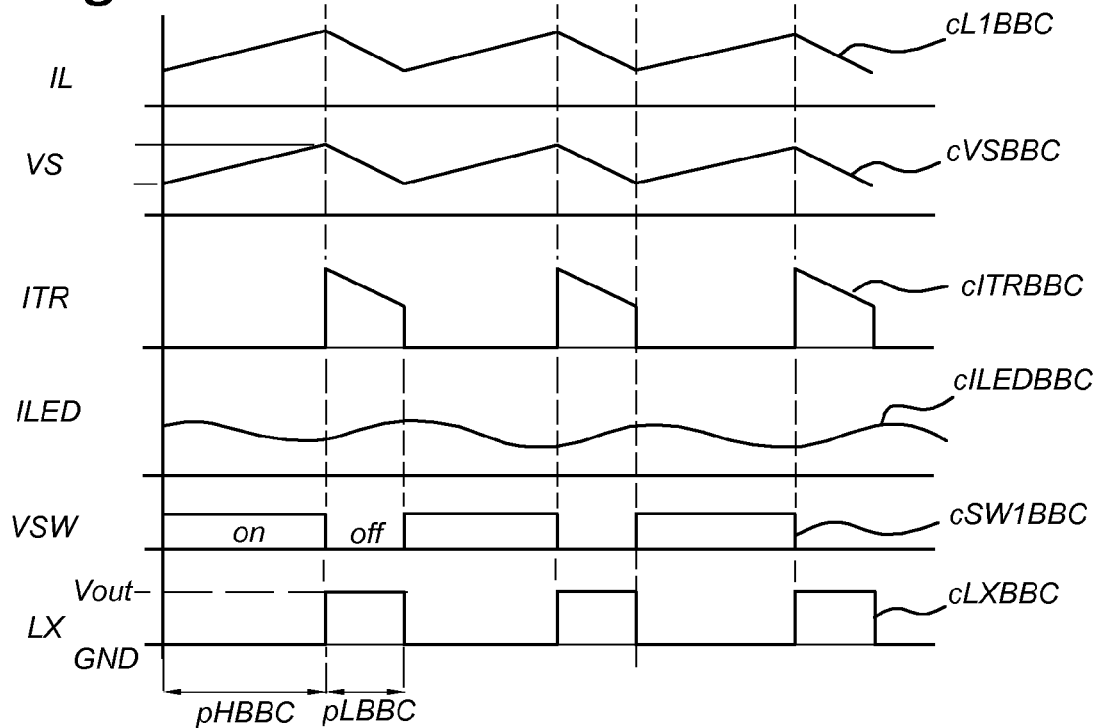
Figure 7D:
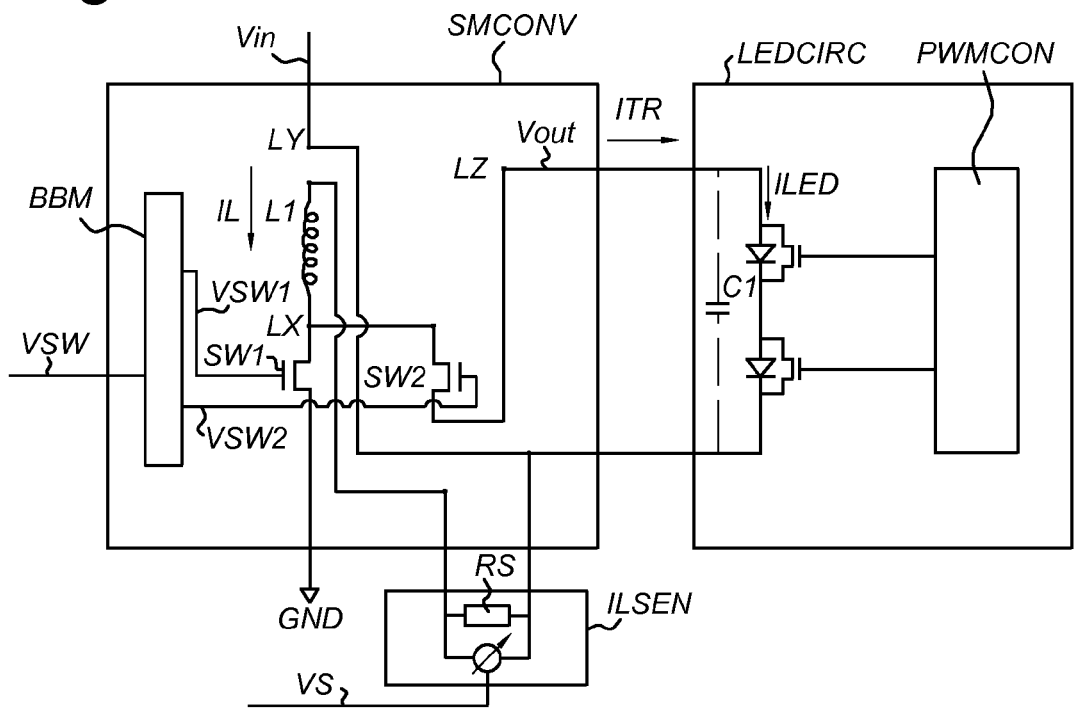

FIGS. 7b and 7c shows electrical signals related to the embodiment of FIG. 7a without and with an optional capacitor in the LED circuit arrangement respectively. Curves cL1BB and cL1BBC show the converter current IL as a function of time, i.e. the current through the inductor L1 and through the sense resistor RS, for the LED circuit arrangement LEDCIRC without and with the capacitor C1 respectively. Curves cVSBB and cVSBBC show the current sensing voltage VS as a function of time. Curve cITRBB and cITRBBC show a transfer current ITR as a function of time, i.e. the current fed from the circuit arrangement CIRC to the LED circuit arrangement LEDCIRC. Curve cILEDBB and cILEDBBC show the LED current as a function of time, i.e. the current flowing through the LEDs (when the associated bypass switch in the LED circuit arrangement is open). Curve cSW1BB and cSW1BBC show the switching control voltage VSW, which can take a high logic level LHL corresponding to a closed switch SW1 or a low logic level LLL corresponding to an open switch SW1. Curves cLXBB and cLXBBC show the voltage at node LX, which can take a low value corresponding to ground or a high value corresponding to the output voltage Vout.

To maintain Volt-second balance for the inductor L1 it can be seen that the output voltage Vout is always larger than the input voltage Vin. Since the LED circuit arrangement LEDCIRC is connected between Vout and Vin, a voltage can be generated over the LED circuit arrangement LEDCIRC that is smaller or larger than Vin, thus allowing to handle a wide range of load variation of the LED circuit arrangement.

Intermediate node LX switches to an output voltage Vout, or to ground GND, depending on the state of the switch SW1, as is shown by the curve cLXBB showing the voltage at node LX and the curve cSW1BB showing the switching voltage VSW in FIG. 7b and the curves cLXBBC and cSW1BBC in FIG. 7c. Switching the LX node to the output voltage Vout or to ground GND respectively discharges and charges the inductor L1 and consequently increases or decreases the current level of the converter current IL in a decrease phase pLBB, P1BBC and an increase phase pHBB, pHBBC respectively.

In this example of the Buck-Boost converter feeding a LED circuit arrangement of a series arrangement of LEDs, a flow of the converter current IL to the LED circuit arrangement, indicated in the Figures as a transfer current ITR, is prevented during the increase phase pHBB, pHBBC, in which the switch SW1 is closed, connecting node LX to ground GND, as is shown by curves cILEDBB in FIG. 7b. The transfer current ITR is thus zero during the increase phase pHBB, pHBBC, and hence the LED current ILED is also zero when the LED circuit arrangement has no capacitor C1. During the decrease phase pLBB, pLBBC, the switch SW2 is open, the inductor L1 discharges via the diode D2 and the inductor L1 thus feeds the converter current IL as the transfer current ITR to the LED circuit arrangement, such that the LED current is equal to the converter current during the decrease phase pLBB, pLBBC. The mean LED current level thus is a weighted average of the peak current level and the valley current level of the converter current.

For this exemplary embodiment using a Buck-Boost converter and denoting the mean LED current level with ILEDave, the peak current level of the converter current with ILH, the valley current level of the converter current with ILL, the weighting average can be further expressed using the increase time duration TH, the decrease time duration TL, the converter current period T, with T=TH+TL, as:

$$ILEDave=(TL\cdot(ILH+ILL)/2)/(TH+TL) \quad (6)$$

Expressing the peak current level and the valley current level of the converter current in terms of the upper trip voltage VH and the lower trip voltage VL, this may be rewritten as:

$$ILEDave=(TL\cdot(VH+VL)/(2\cdot RS))/(TH+TL)=(TL/T)\cdot (VH+VL)/(2\cdot RS) \quad (7)$$

Alternatively, the weighting can be expressed using the output voltage Vout, corresponding to the voltage over the series arrangement of LEDs in the LED circuit arrangement when all LEDs are emitting light, and the input voltage Vin, as $$ILEDave=(Vin/(Vin+Vout))\cdot(VH+VL)/(2\cdot RS) \quad (8)$$

An advantage of using the input and output voltage to obtain the weights for determining the mean LED current level is that no time durations need to be measured. Also, the output voltage Vout may also be used as the indicator for the load.

When the optional capacitor C1 is present in the LED circuit arrangement, the transfer current ITR current feeding the LED circuit arrangement still has the same shape as curve cITRBB in FIG. 7b, but the LED current ILED flowing through (or bypassing) the LEDs is smoothed and behaves as shown as cILEDBBC in FIG. 7c. Comparing the curves in FIG. 7c with the curves in FIG. 7b, it can be observed that the capacitive filter C1 provides a smoothing of the LED current amplitude, with the beneficial effects that the lifetime of the LEDs is increased since the peak current level through the LEDs is reduced. Also the ripple amplitude of the LED current is reduced, reducing the ripple amplitude of the light level. Alternatively, with a capacitive filter C1, a larger fluctuation of the converter current can be allowed through the inductor to achieve the same LED current ripple amplitude as for a LED circuit arrangement without a capacitive output filter, which has the advantage of a smaller inductance value and size.

The relation between the converter current, shown as cL1BB and cL1BBC in FIG. 7b and FIG. 7c respectively, and the LED current, shown as cLEDBB and cLEDBBC in FIG. 7b and FIG. 7c respectively, is taken into account when determining the upper trip current level or upper trip voltage level and determining the lower trip current level or lower trip voltage level.

The converter current sensor ILSEL in FIG. 7a is similar to the one shown in FIG. 6a, but may also be of a similar type as the one shown in FIG. 6c.

An alternative switch-mode converter SMCONV shown in FIG. 7b includes a switch SW1, a second switch SW2 and an inductor L1.

The switch-mode converter SMCONV of FIG. 7b is the same as that of FIG. 7a, but for the presence of a second switch SW2 replacing the diode D2, and the addition of a break-before-make circuit BBM.

The switch-mode converter SMCONV is in electrical communication with the hysteretic comparator HCOMP to receive the switching control voltage VSW via the break-before-make circuit BBM. The break-before-make circuit BBM comprises a timing circuit which assures that the two switches SW1 and SW2 can not both be closed at the same time, as this would result in a short circuit of the output voltage Vout and the ground voltage. The break-before-make circuit BBM is thus operable to generate a first and a second switching control voltage VSW1, VSW2 from the switching control voltage VSW which operate the switches SW1 and SW2 to never be closed simultaneously.

The converter current sensor ILSEL in FIG. 7b is similar to the one shown in FIG. 6a, but may also be of a similar type as the one shown in FIG. 6c.

Figure 8A:
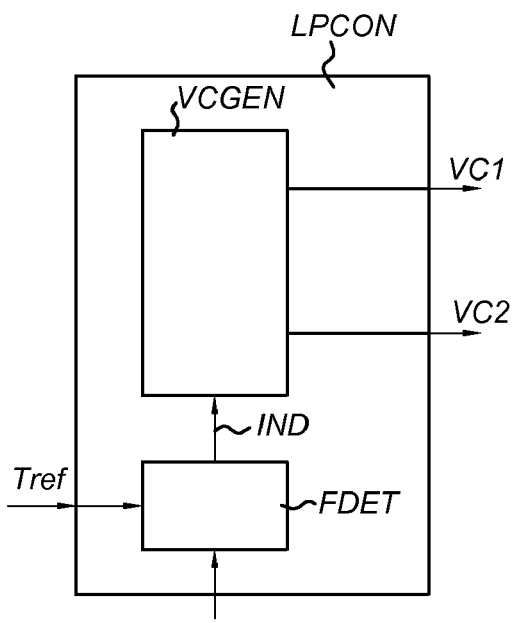
FIGS. 8a-8b show exemplary embodiments of the converter current period controller usable in embodiments of a circuit arrangement according to the invention.

FIG. 8a shows a first exemplary embodiments of the converter current period controller LPCON usable in embodiments of a circuit arrangement according to the invention. The converter current period controller LPCON comprises a trip control voltage generator VCGEN operable to establish a first trip control voltage VC1 and a second trip control voltage VC2.

The first and second trip control voltages VC1, VC2 may be voltages with a first and second trip control voltage level, and the trip control voltage generator VCGEN may be operable to establish these voltages to make these voltages available to the hysteretic comparator HCOMP. The voltage establishing unit VEST in the hysteretic comparator HCOMP is operable to establish the upper and lower trip voltages VH, VL in response to the first and second trip control voltages VC1, VC2 by, e.g. a direct electrical connection.

The first and second trip control voltages VC1, VC2 may alternatively a be first and second trip control voltage level value, and the trip control voltage generator VCGEN may be operable to supply these voltage level values, e.g. as digital signals or digital register values, to the hysteretic comparator HCOMP. The voltage establishing unit VEST in the hysteretic comparator HCOMP is operable to establish the upper and lower trip voltages VH, VL in response to the first and second trip control voltages VC1, VC2 in the form of trip control voltage level values by, e.g. a voltage generator.

Figure 8B:
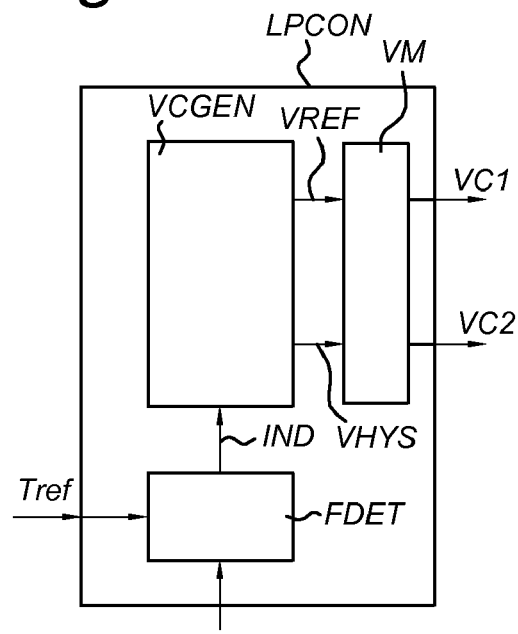

FIG. 8b shows a second exemplary embodiments of the converter current period controller LPCON usable in embodiments of a circuit arrangement according to the invention. The converter current period controller LPCON comprises a trip control voltage generator VCGEN operable to establish a first trip control voltage VC1 and a second trip control voltage VC2 in cooperation with a voltage mixer VM.

In this example, the trip control voltage generator VCGEN is operable to establish the reference voltage VREF and the hysteresis voltage VHYS, corresponding to the mean of the first and second trip control voltages VC1, VC2 associated with the mean current level and the difference between the first and average control voltages VC1, VC2 associated with the current ripple dI.

In this example, the voltage mixer VM is operable to determine the first and second trip control voltage VC1, VC2 by adding half the hysteresis voltage VHYS to the reference voltage VREF to achieve the first trip control voltage VC1 and by subtracting half the hysteresis voltage VHYS from the reference voltage VREF to achieve the second trip control voltage VC2, as:

$$VC1 = VREF + VHYS/2,$$

$$VC2 = VREF - VHYS/2.$$

Figure 9A:
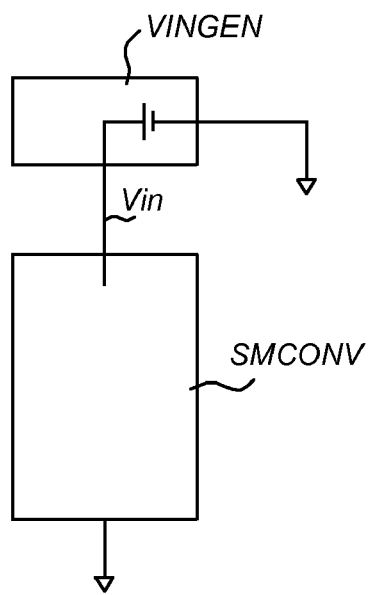
FIGS. 9a-9b show exemplary embodiments of the power supply usable in embodiments of a circuit arrangement according to the invention.

FIG. 9a shows a first exemplary embodiment of the power supply VINGEN usable in embodiments of a circuit arrangement according to the invention. The power supply VINGEN is in electrical communication with the switch-mode converter SMCONV. The power supply VINGEN is operable to deliver an input supply voltage Vin to the switch-mode converter SMCONV.

Figure 9B:
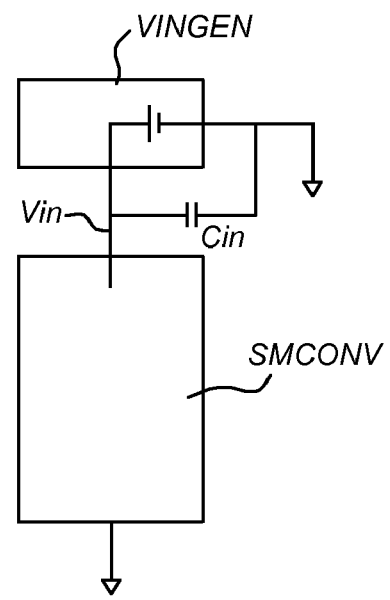

FIG. 9b shows a second exemplary embodiment of the power supply VINGEN usable in embodiments of a circuit arrangement according to the invention. The power supply VINGEN is in electrical communication with the switch-mode converter SMCONV. The power supply VINGEN is operable to deliver an input supply voltage Vin to the switch-mode converter SMCONV. A capacitive input filter Cin is in electrical communication with the power supply VINGEN and with the switch-mode converter SMCONV, in order to stabilize the input supply voltage Vin as received by the switch-mode converter SMCONV.

Figure 10:
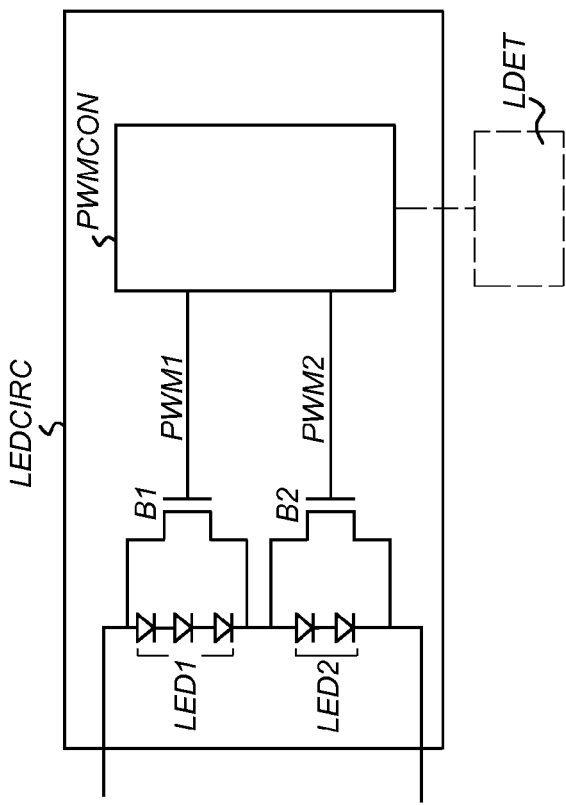
FIG. 10 shows a LED circuit arrangement with bypass switches.

FIG. 10 shows an example of a LED circuit arrangement LEDCIRC. The LED circuit arrangement LEDCIRC comprises a first LED LED1 and a second LED LED2, each associated with a respective switching element B1, B2. In this example, the first LED LED1 is a series arrangement of three green LEDs and the second LED LED2 is a series arrangement of two blue LEDs.

In this example, the voltage over the series arrangement of the three green LEDs is typically 10.8 V when a LED current with a mean current level of approx. 700 mA is flowing through the green LEDs. The voltage over the series arrangement of the two blue LED is typically 7.2 V when a LED current with a mean current level of approx. 700 mA is flowing through the blue LEDs.

The first switching element B1 is electrically parallel to the first LED LED1 and the second switching element B2 is electrically parallel to the second LED LED2. The first and second switching elements B1, B2 are operable by a LED segment controller PWMCON for selecting the path of the LED current to pass through the LED associated with the switching element or to bypass the LED associated with the switching element. The LED arrangement thus allows to vary the effective light output of each of the two LEDs individually, by varying the time that the path of the LED current passes through a LED with a duty cycle of a control period. The relative ratio of light emitted by the green LED LED1 and blue LED LED2 may thus be controlled. The control period is a period of a fixed length, also referred to as a pulse width modulation period corresponding to a pulse width modulation frequency of 300 Hz. The duty cycle associated with operating the first LED LED1 to emit light is further referred to as the first LED duty cycle PWM1. The duty cycle associated with operating the second LED LED2 to emit light is further referred to as the second LED duty cycle PWM2.

In this example, the load corresponding to the LED circuit arrangement may this take four typical values, dependent on the status of the first and second switching elements B1, B2. In this example, the voltage over the LED circuit arrangement may thus be typically 18.0 V when both switching elements B1, B2 are open and the LED current with a mean current level of approx. 700 mA is flowing through the green and the LEDs. The voltage over the LED circuit arrangement may thus be typically 10.8 V (plus a small voltage drop over the switching element B2, which is neglected in the discussion for simplicity) when switching element B1 is open and switching element B2 is closed, such that the LED current with a mean current level of approx. 700 mA is flowing through the green LEDs but bypassing the blue LEDs. Likewise, the voltage over the LED circuit arrangement may thus be typically 7.2 V when switching element B1 is closed and switching element B2 is open, such that the LED current with a mean current level of approx. 700 mA is flowing through the blue LEDs but bypassing the green LEDs. Likewise, the voltage over the LED circuit arrangement may thus be close to 0 (only a small voltage drop over the switching elements B1, B2, which is neglected in the discussion for simplicity) when switching element B1 and B2 are both closed, such that the LED current with a mean current level of approx. 700 mA is bypassing both the green LEDs and the blue LEDs.

Figure 11:
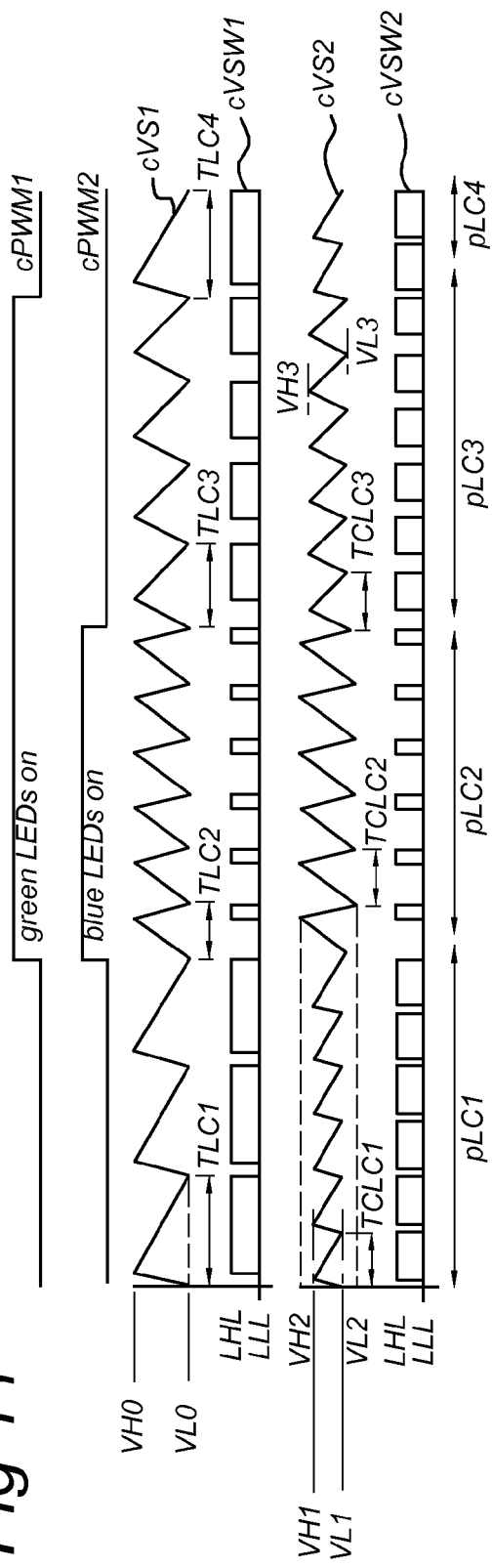
FIG. 11 shows a simulation of the electrical characteristics as a function of time of a circuit arrangement when operated with a LED circuit arrangement.

FIG. 11 shows a simulation of the electrical characteristics as a function of time of the circuit arrangement CIRC when operated with the LED circuit arrangement LEDCIRC shown in FIG. 10.

A first curve cPWM1 shows a control signal associated with the first LED duty cycle PWM1 associated with the green LED LED1 and associated with operation of the first switching element B1. A second curve cPWM2 shows a control signal associated with the second LED duty cycle PWM2 associated with the blue LED LED2 and associated with operation of the second switching element B2. A low level of the curve cPWM1 or cPWM2 corresponds to a closed switch B1 or a closed switch. B2 respectively, i.e. to the current flowing through the corresponding switching element and bypassing the corresponding LED, which is then turned off. A high level of the curve cPWM1 or cPWM2 corresponds to an open switch B1 or an open switch B2 respectively, i.e. to the current flowing through the corresponding LED, which is then turned on.

The curves start at a first load condition LC1 during a first phase pLC1 in which switch B1 and switch B2 are both closed and the green LED LED1 and the blue LED LED2 are both off.

During a second phase pLC2 with a second load condition LC2, switch B1 and switch B2 are both open and the green LED LED1 and the blue LED LED2 are both on.

During a third phase pLC3 with a third load condition LC3, switch B1 is open and switch B2 is closed, such that the green LED LED1 is on and the blue LED LED2 is off.

A fourth phase pLC4 is again at load condition LC1, corresponding to the setting of the switches B1, B2 as in the first phase pLC1.

Another possible load condition LC4 (not shown) corresponds to a condition in which switch B1 is closed and switch B2 is open, such that the green LED LED1 is off and the blue LED LED2 is on.

A third curve cVS1 shows the converter current sensing voltage VS as a function of time when a circuit arrangement according to the prior art is used to regulate the flow of the current through the LED circuit arrangement. An oscillation of the current sensing voltage VS is observed with a saw-tooth behaviour between an upper trip voltage VH0 and a lower trip voltage VL0 during the first phase pLC1, the second phase pLC2, the third phase pLC3 and the fourth phase pLC4. It may be observed that the period of the oscillation of the current sensing voltage VS, and hence also of the current level of the converter current IL, corresponds to a relatively long duration TLC1 during the first phase pLC1, to a relatively short duration TLC2 during the second phase pLC2, and to an approximately middle duration TLC3 during the third phase pLC3. Load condition LC5 would correspond to another duration TLC5 (not shown).

A fourth curve cVSW1 shows the switching control voltage VSW which is outputted by the hysteretic comparator HCOMP when the circuit arrangement according to the prior art is used to regulate the flow of the current through the LED circuit arrangement. The switching control voltage VSW is at a logical low level LLL during part of the oscillation with an a increase time duration in which the converter current sensing voltage VS is increasing, and is at a logical high level LHL during a second part of the oscillation with a decrease time duration in which the converter current sensing voltage VS is decreasing. The switching control voltage VSW shows an oscillation with a block-shape behaviour with the same oscillation periods as the current sensing voltage VS.

A fifth curve cVS2 shows the converter current sensing voltage VS as a function of time when a circuit arrangement according to the invention is used to regulate the flow of the current through the LED circuit arrangement. In particular, a circuit arrangement with a switch-mode converter with a Buck-converter topology similar to the one described with reference to FIG. 6b is used, and a converter current period controller using the switching control voltage VSW for determining the indicator IND associated with the converter current period T is used similar to the one described with reference to FIG. 4b. Similar curves would have been obtained when a converter current period controller similar to the ones described in reference to FIG. 4a or 4c would be used.

An oscillation of the current sensing voltage VS, corresponding to an oscillation of the converter current IL fed to the LED circuit arrangement and hence associated with an oscillation of the current level of the LED current flowing through the LED circuit arrangement, is observed with a saw-tooth behaviour between an upper trip voltage VH1 and a lower trip voltage VL1 during the first phase pLC1. The current sensing voltage VS oscillates between an upper trip voltage VH2 and a lower trip voltage VL2 during the second phase pLC2, with a larger amplitude than during the first phase pLC1, and between an upper trip voltage VH3 and a lower trip voltage VL3 during the third phase pLC3, with a middle amplitude compared to the amplitude during the first phase pLC1 and the second phase pLC2.

It may be observed that the period of the oscillation of the current sensing voltage VS, and hence also of the converter current IL, corresponds to a substantially fixed duration, denoted with TCLC1 during the first phase pLC1, with TCLC2 during the second phase pLC2, and with TCLC3 during the third phase pLC3.

Figure 12:
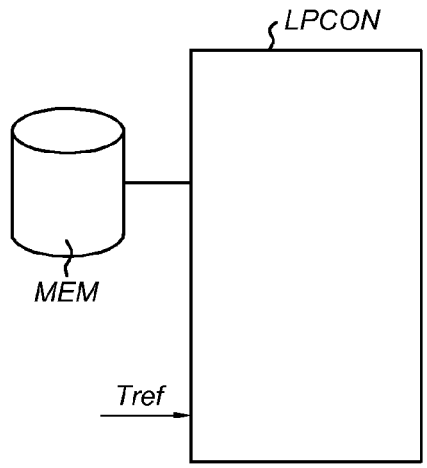
FIG. 12 shows a further embodiment of the converter current period controller.

FIG. 12 shows a further embodiment of the converter current period controller LPCON. The converter current period controller LPCON is in electrical communication with a memory unit MEM. The memory unit MEM comprises a table with voltage settings for a plurality of possible indicator values of the indicator IND, e.g. as illustrated below.

In an example, when applied with the LED circuit arrangement shown in FIG. 10 and discussed in reference with FIG. 11, the plurality of possible indicator values are the load conditions LC1, LC2, LC3 and LC4. The load condition may be expressed internally in the circuit and as entries for the table in the memory unit MEM, e.g. as an enumeration of the load conditions, as the status of the switches B1, B2 denoted in a binary manner as '00' for LC1, '11' for LC2, '10' for LC3 and '01' for LC4', or in any other suitable manner. The status of the switches B1, B2 may be obtained from the LED controller PWMCON.

In an example, the table comprises adjusted upper trip voltage levels VHA and adjusted lower trip voltage levels VLA, addressed using the binary notation described above. In one example, the adjusted upper trip voltage levels VHA and adjusted lower trip voltage levels VLA are pre-determined for each load condition and are fixedly stored in a table in the memory unit MEM for retrieval only when the load condition is changed.

In an alternative example, estimates of the adjusted upper trip voltage levels VHA and adjusted lower trip voltage levels VLA are pre-determined for each load condition and are stored in a readable and writable table in the memory unit MEM for retrieval when the load condition is changed. The converter current period T may then be outside, although in close vicinity, to the period control range Tref. The converter current period is then measured, e.g. from the current sensing voltage VS as described above, and the upper trip voltage level VHA and lower trip voltage level VLA are adjusted until the converter current period T is inside the period control range Tref. The corresponding adjusted upper trip voltage level VHA and adjusted lower trip voltage level VLA are then written to the table in the memory unit MEM. As a result, the system shows a self-learning behaviour in which the voltage level is stored in the memory unit at the latest occurrence of the specific load condition and the last used voltage level may be retrieved upon a next occurrence of the specific load condition.

Figure 13:
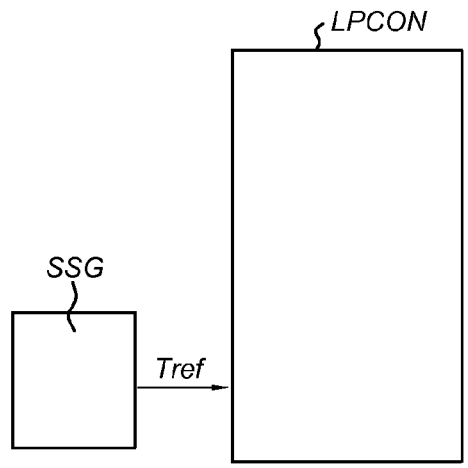
FIG. 13 shows another further embodiment of the converter current period controller.

FIG. 13 shows another further embodiment of the converter current period controller LPCON. The converter current period controller LPCON is in electrical communication with a spread spectrum generator SSG. The spread-spectrum generator SSG is operable for varying a centre duration of the period control range Tref over a pre-determined spectral band. This allows to distribute the energy in a well-controlled manner over a specific spectral band.

Figure 14:
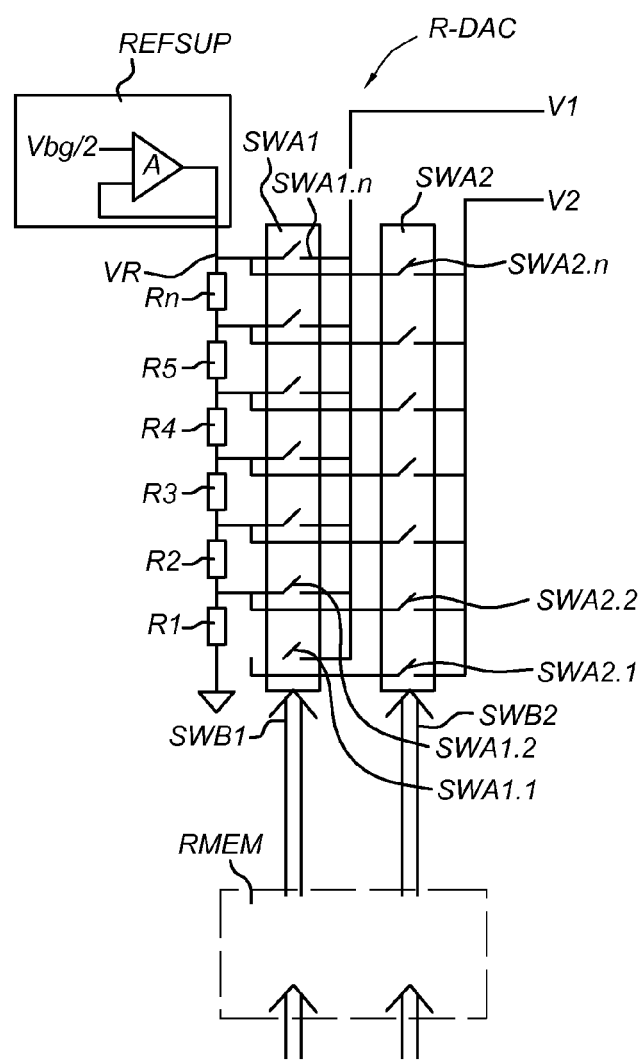
FIG. 14 shows an exemplary embodiment of a resistive digital-to-analogue converter usable in embodiments of a circuit arrangement according to the invention.

FIG. 14 shows an exemplary embodiment of a resistive digital-to-analogue converter R-DAC usable in embodiments of a circuit arrangement CIRC for establishing a first voltage V1 and a second voltage V2.

The first voltage V1 and the second voltage V2 may e.g. be used as the upper trip voltage VH and the lower trip voltage VL by the hysteretic comparator HCOMP. Alternatively, the first voltage V1 and the second voltage V2 may e.g. be used as the first trip control voltage VC1 and the second trip control voltage VC2 by the trip control voltage generator VCGEN.

As an example, the resistive digital-to-analogue converter R-DAC shown in FIG. 14 comprises a converter reference voltage supply REFSUP arranged to provide a converter reference voltage VR. The converter reference voltage supply REFSUP is in electrical communication with a series circuit of N resistors R1-RN, in the example R1-R6 for N=6.

A first switch array SWA1 comprises a plurality of switches and a second switch array SWA2 comprising a plurality of switches. Each plurality of switches comprises N+1 switches SWA1.0-SWA1.N, SWA2.0-SWA2.N respectively.

Each of the switches SWA1.0-SWA1.N of the first switch array SWA1 is in electrical communication with the series circuit of resistors R1-RN tapping off at a corresponding position along the series circuit of resistors R1-RN.

Each switch array SWA1, SWA2 is arranged to be controlled with a digital control word SWB1, SWB2 comprising a plurality of N+1 bits, the bits being associated with controlling the switches to tap off the series circuit of resistors at the corresponding position.

The first voltage V1 and the second voltage V2 are tapped from the same series circuit of resistors with the first switch array SWA1 and the second switch array SWA2 respectively.

The converter reference voltage supply REFSUP may derive the converter reference voltage VR from, e.g. a bandgap voltage Vbg such that a well-defined voltage reference level is obtained. The bandgap voltage Vbg may be amplified by an amplifier A to obtain the converter reference voltage VR.

When the resistor values for each of the resistors R1-RN are the same, the R-DAC provides a linear voltage divider.

When establishing an adjusted upper trip voltage VHA and an adjusted lower trip voltage VLA from the upper trip voltage VH and the lower trip voltage VL, the mean voltage level may thus be easily maintained when stepping up and down the R-DAC with the same number of bits. The converter current period T, associated with the difference between the upper trip voltage VH and the lower trip voltage VL, may thus be adjusted while maintaining the mean current level, associated with the mean voltage between the upper trip voltage VH and the lower trip voltage VL.

In an embodiment (not shown), the memory unit MEM described above may comprise a R-DAC memory RMEM, operable to store and retrieve the digital control word R-DAC switch settings SWB1, SBW2.

Figure 15A:
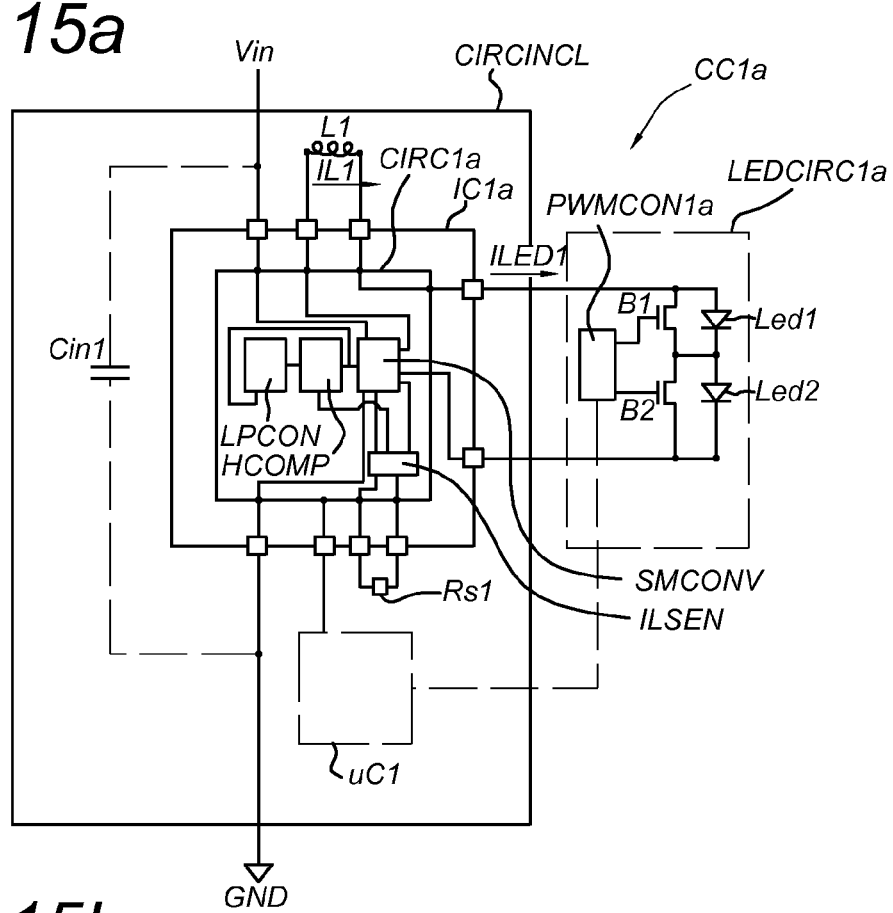
FIG. 15a shows a circuit composition comprising a LED driver IC and a LED circuit arrangement according to the invention.

FIG. 15a schematically shows a circuit composition CC1a comprising a LED driver IC IC1a and a LED circuit arrangement LEDCIRC1a. The LED driver IC IC1a is electrically connected to a LED circuit arrangement LEDCIRC1a. The LED circuit arrangement LEDCIRC1a may be a LED circuit arrangement CIRC1a like the one described in reference with FIG. 10, but may also be another LED arrangement suitable to be driven by the LED driver IC IC1a. The LED driver IC IC1a comprises an embodiment of a circuit arrangement CIRC according to the invention, comprising a switch-mode converter SMCONV, a hysteretic comparator HCOMP, a converter current sensor ILSEN and a converter current period controller LPCON. The connections internally in the LED driver IC IC1a are drawn according to an embodiment as shown in FIG. 4b using the switching voltage VSW to determine the indicator associated with the converter current period and employing a Buck-converter topology for the switch mode converter SMCONV like the one discussed in reference with FIG. 6a with an externally connected inductor L1, but may be according to any suitable configuration.

The LED driver IC IC1 is connected between a ground voltage GND and an input voltage Vin. The input voltage Vin is delivered by a power supply (not shown), e.g. a DC power supply delivering a supply voltage of 24 V.

In the example shown, a capacitor Cin1 is placed over the LED driver IC IC1a to act as a capacitive input filter on the power supply voltage Vin.

In the example shown, the LED driver IC IC1a and the switch-mode converter SMCONV in the circuit arrangement CIRC1a are in electrical communication with an inductor L1 which is a discrete component external to the LED driver IC IC1a. The inductor L1 is in electrical communication with the LED circuit arrangement LEDCIRC1a via a connection internal in the LED driver IC IC1.

In the example shown, the LED driver IC IC1a and converter current sensor ILSEN in the circuit arrangement CIRC1a are in electrical communication with a resistor RS1 which is a discrete component external to the LED driver IC IC1a.

A programmable processor uC1, such as a microprocessor, a FPGA, a DSP or any other programmable unit may optionally be connected, as shown by a dashed line, to the LED driver IC IC1a. The processor uC1 may alternatively or additionally be connected to a LED segment controller PWM- CON1 in the LED circuit arrangement LEDCIRC1a, as shown by a further dashed line.

A computer program product arranged to perform elements of any one of the methods implemented as described above, may be loaded in the programmable processor, e.g., via an interface connection connectable, directly or via intermediate units, to the programmable processor or to a memory in communication with or included in the programmable processor. The computer program product may be read from a computer-readable medium, e.g., a solid state memory such as a flash memory, EEPROM, RAM, an optical disk loaded in an optical disk drive, a hard disk drive (HDD), or any other computer-readable medium. The computer-readable medium may be read by a dedicated unit, such as the optical disk drive to read the optical disk, directly by the programmable processor, such as a EEPROM connected to the programmable processor, or via other intermediate units.

The programmable processor uC1 may, e.g. comprise a colour control algorithm to keep a selected colour balance between the light output of the plurality of LEDs.

The programmable processor uC1 may, e.g. cooperate with a LED segment controller PWMCON in the LED circuit arrangement to define the pulse width modulation signals.

The programmable processor uC1 may, e.g. cooperate with the spread spectrum generator SSG to the period control range Tref, or implement the function of the spectrum generator SSG in the programmable processor uC1 itself.

The programmable processor uC1 may be connected to the LED driver IC IC1 as shown in FIG. 15a. Alternatively, the programmable processor uC1 may be comprised in the LED driver IC IC1.

The programmable processor uC1 may, e.g. be comprised in the converter current period controller LPCON, to, e.g. implement the determination of the indicator and the determination of the trip control voltage values in a computer program product. E.g., the programmable processor uC1 may be arranged to retrieve the status of bypass switches B1, B2 arranged for controlling the path of the current ILED1 through a first LED Led1 and a second LED Led2 in the LED circuit arrangement LEDCIRC1a. The status of the switches may be used as a load indicator associated with the load of the LED circuit arrangement and indicative for the converter current period at a known upper trip voltage VH and lower trip voltage VL. The computer program product loaded in the programmable processor uC1 may be arranged to receive the status of the switches and derive an adjusted upper trip voltage VHA and adjusted lower trip voltage VLA, in order to obtain a converter current period within the pre-determined reference window Tref.

The Figure also indicates a further circuit arrangement CIRCINCL which can be classified as a circuit arrangement according to the invention. The further circuit arrangement CIRCINCL comprises the LED driver IC IC1a, the optional programmable processor uC1, the inductor L1, the resistor RS1 and the optional capacitor Cin1.

The LED driver IC IC1a thus provides an integrated circuit which includes the circuit to regulate the mean current level and the period of the converter current IL1.

Figure 15B:
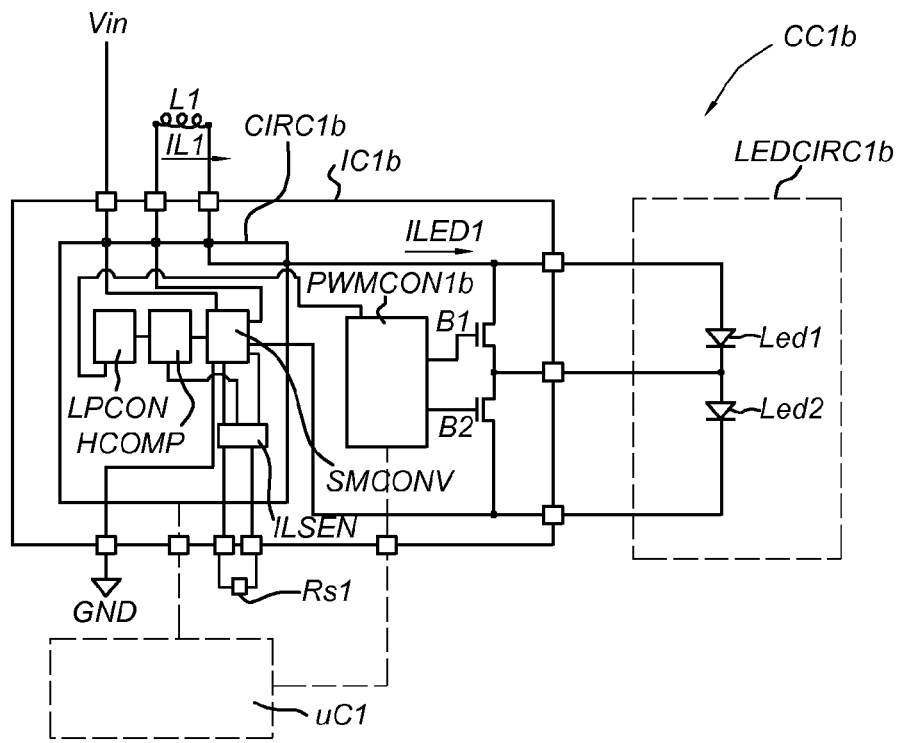
FIG. 15b shows another circuit composition comprising a LED driver IC and a LED circuit arrangement according to the invention.

FIG. 15b schematically shows a circuit composition CC1a comprising a LED driver IC IC1b and a LED circuit arrangement LEDCIRC1b. The LED driver IC IC1b is electrically connected to a LED circuit arrangement LEDCIRC1 b. The LED circuit arrangement LEDCIRC1b as shown in FIG. 15b comprises a series arrangement of a first LED Led1 and a second LED Led2. The LED driver IC IC1b comprises an embodiment of a circuit arrangement like described above, comprising a switch-mode converter SMCONV, a hysteretic comparator HCOMP, a converter current sensor ILSEN, a converter current period controller LPCON, and also comprises a LED segment controller PWMCON1b and two bypass switches B1, B2. The LED segment controller PWMCON1b is operable to control two bypass switches B1, B2. The bypass switch B1 is connected parallel to the first LED Led1. The bypass switch B2 is connected parallel to the second LED Led2.

The connections internally in the LED driver IC IC1b are drawn for an exemplary embodiment which uses the status of the bypass switches B1, B2 the LED segment as a load indicator communicated from the controller PWMCON1b to the converter current period controller LPCON for determining the indicator for the converter current period, like discussed above in reference with FIG. 4c. The exemplary embodiment employs a Buck-converter topology for the switch mode converter SMCONV like the one discussed in reference with FIG. 6a with an externally connected inductor L1. The connections and embodiments of the units inside the IC may however alternatively be according to any other suitable configuration.

The LED driver IC IC1 is connected between a ground voltage GND and an input voltage Vin. The input voltage Vin is delivered by a power supply (not shown), e.g. a DC power supply delivering a supply voltage of 24 V.

In the example shown, the LED driver IC IC1a and the switch-mode converter SMCONV in the circuit arrangement CIRC1a are in electrical communication with an inductor L1 which is a discrete component external to the LED driver IC IC1a. The inductor L1 is in electrical communication with the LED circuit arrangement LEDCIRC1a via a connection internal in the LED driver IC IC1.

In the example shown, the LED driver IC IC1b and the converter current sensor ILSEN in the circuit arrangement CIRC1a are in electrical communication with a resistor RS1 which is a discrete component external to the LED driver IC IC1b.

A programmable processor uC1, such as a microprocessor, a FPGA, a DSP or any other programmable unit may optionally be connected, as shown by a dashed line, to the LED driver IC IC1b. The processor uC1 communicate with the LED segment controller PWMCON1b in the LED driver IC IC1b, as shown by a further dashed line.

The LED driver IC IC1b thus provides an integrated circuit which includes both the circuit to regulate the mean current level and the period of the LED current ILED1, and the circuit for operating the LEDs with pulse width modulation. Such an integrated circuit may be appreciated for high-volume applications, as it may provide a cost-effective system.

FIG. 16 schematically shows a circuit composition CC2 comprising a LED driver IC IC2, a first LED circuit arrangement LEDCIRC1 and a second LED circuit arrangement LEDCIRC2. The LED driver IC2 is electrically connected to the first LED circuit arrangement LEDCIRC1 and to the second LED circuit arrangement LEDCIRC2.

The first LED circuit arrangement LEDCIRC1 may, e.g. be a LED circuit arrangement comprising a green LED Led1 and a blue LED Led2 in series. The second LED circuit arrangement LEDCIRC2 may, e.g. be a LED circuit arrangement comprising a LED segment Led3 comprising two red LEDs and an amber LED Led4 in series.

The LED driver IC2 comprises a first circuit arrangement CIRC1 according to the invention and a second circuit arrangement CIRC2 according to the invention, to respectively regulate a first LED current ILED1 flowing through the first LED circuit arrangement LEDCIRC1 and regulate a second LED current ILED2 flowing through the second LED circuit arrangement LEDCIRC2.

The first circuit arrangement CIRC1 and the first LED circuit arrangement LEDCIRC1 are, during use, in electrical communication with a first inductor L1 and a first resistor Rs1, the first inductor L1 and the first resistor Rs1 being external to the IC. The second circuit arrangement CIRC2 and the second LED circuit arrangement LEDCIRC2 are, during use, in electrical communication with a second inductor L1 and a second resistor Rs2, the second inductor L1 and the second resistor Rs2 also being external to the IC.

The LED driver IC IC2 further comprises a first LED segment controller PWMCON1 operable to control two bypass switches B1, B2, also integrated in the IC. The two bypass switches B1, B2 are operable to select the path of the first LED current ILED1 through the first LED circuit arrangement LEDCIRC1 and are associated with the green LED Led1 and the blue LED Led2. The bypass switch B1 is connected parallel to the green LED Led1. The bypass switch B2 is connected parallel to the blue LED Led2.

The LED driver IC IC2 further comprises a second LED segment controller PWMCON2 operable to control a further two bypass switches B3, B4, also integrated in the IC. The two bypass switches B3, B4 are operable to select the path of the second LED current ILED2 through the second LED circuit arrangement LEDCIRC2 and are associated with the two red LEDs Led3, and the amber LED Led4. The bypass switch B3 is connected parallel to the LED segment Led3, i.e. to the series arrangement of the two red LEDs. The bypass switch B4 is connected parallel to the amber LED Led4.

The first LED segment controller PWMCON1 and the second LED segment controller PWMCON2 may operate each using an individual clock as a reference for the pulse width modulation resolution, but may alternatively be operated from a common clock. When using individual clocks, the clock period associated with the clock may be substantially the same or substantially different. In an embodiment, the clock generator of the second LED segment controller PWMCON2 behaves as a slave to the first LED segment controller PWMCON1, and the clock of the second LED segment controller PWMCON2 is derived from the clock of the first LED segment controller PWMCON1. The clocks may be generated in the LED driver IC itself, or be provided from externally, e.g. by an externally mounted crystal oscillator. The pulse width period may be substantially the same for the first LED segment controller PWMCON1 and the second LED segment controller PWMCON2, but may alternatively be different in order not to spread the energy associated with the pulse width modulation period over a spectral band.

The LED driver IC IC2 is connected between a ground voltage GND and an input voltage Vin. The input voltage Vin is delivered by a power supply (not shown), e.g. a DC power supply delivering a supply voltage of 24 V.

The LED driver IC IC2 may be further connected to a programmable processor uC2. The programmable processor uC2 may be of similar nature and perform similar functions as the programmable processor uC1 described in reference with FIG. 15a.

The LED driver IC IC2 thus provides an integrated circuit which includes both the circuit to regulate the mean LED current level and the period of the oscillation of the LED current, associated with the oscillation of the converter current, and the circuit for operating the LEDs with pulse width modulation, for a lighting system comprising four LED colours. The effective light output of each of the four LED colours can be controlled individually. Hence, a cost-effective lighting system with a high degree of colour control and intensity control may be constructed by employing such an integrated circuit.

FIG. 17 shows an example of a light source 5000 with a LED assembly 4000 in a housing 5001. The housing 5001 is a box with, preferably, reflective inner walls. The LED assembly 4000 comprises one or more LEDs and a circuit arrangement employing, during use, one of the methods implemented as described above. The light generated by the LED assembly 4000 is reflected towards the front of the housing 5001, which is covered with a diffusive transparent plate 5002. The light source 5000 carries a power adapter 5010, which supplies the LED assembly 4000 from a power converter, connected to the mains via a power cord 5011 with a power connecter 5012, to fit a wall contact (not shown) with mains supply.

It should be noted that the above-mentioned embodiments illustrate rather than limit the invention, and that those skilled in the art will be able to design many alternative embodiments are conceivable without departing from the scope of the appended claims. E.g., the LED circuit arrangement may comprise more than two segments, each being controllable with a respective switch, or the LED circuit arrangement may comprise a further LED segment which is not controllable with a switch, without departing from the scope of the invention and the appended claims. In the claims, any reference signs placed between parentheses shall not be construed as limiting the claim.

The invention claimed is:

1. A circuit arrangement for regulating a LED current flowing through a LED circuit arrangement at a mean LED current level, the circuit arrangement being arranged for:
   establishing a converter current;
   establishing a first current control indicator representative of current level of the converter current through the circuit arrangement;
   establishing an oscillation of the converter current between a valley current level and a peak current level in dependence on at least the first current control indicator, wherein the mean LED current level corresponds to a weighted average of the peak current level and the valley current level of the converter current;
   establishing a second current control indicator representative of a flow of the converter current through the circuit arrangement;
   controlling a converter current period of the oscillation of the converter current to be within a period control range, the controlling being performed in dependence on the second current control indicator, and
   feeding the LED circuit arrangement with at least part of the converter current.

2. The circuit arrangement according to claim 1, wherein:
   for establishing the first current control indicator, the circuit arrangement comprises:
   a converter current sensor operable to establish a converter current sensing voltage representative of the current level of the converter current flowing in the circuit arrangement and using the determined converter current sensing voltage as the first current control indicator;
   for establishing the oscillation of the converter current, the circuit arrangement comprises:
   a hysteretic comparator operable to establish an upper trip voltage and a lower trip voltage as control crossover thresholds, the upper trip voltage being associated with a peak current level of the converter current and the lower trip voltage being associated a valley current level of the converter current, the hysteretic comparator in electrical communication with the converter current sensor to receive the converter current sensing voltage, wherein the hysteretic comparator is operable to output a switching control voltage at a first logic level in response to each crossover of the lower trip voltage by the converter current sensing voltage in a negative direction, and wherein the hysteretic comparator is operable to output a switching control voltage at a second logic level in response to each crossover of the upper trip voltage by the converter current sensing voltage in a positive direction, and a switch-mode converter operable to control a flow of the converter current through the circuit arrangement, the switch-mode converter in electrical communication with the hysteretic comparator to receive the switching control voltage, wherein the switch-mode converter controls an increase of the converter current from the valley current level to the peak current level in response to the switching control voltage equaling the first logic level, the controlling of the increase of the converter current being associated with an increase time duration, and wherein the switch-mode converter controls a decrease of the converter current from the peak current level to the valley current level in response to the switching control voltage equaling the second logic level, the controlling of the decrease of the converter current being associated with a decrease time duration, and for controlling the converter current period of the oscillation of the converter current, the circuit arrangement comprises:

a converter current period controller operable to control the converter current period, the converter current period controller being in electrical communication with at least the hysteretic comparator;

wherein the converter current period corresponds to a sum of the increase time duration and the decrease time duration.

3. The circuit arrangement according to claim 2, wherein the converter current period controller comprises:

a trip control voltage generator operable to establish a first trip control voltage and a second trip control voltage, and wherein the hysteretic comparator is operable to establish the upper trip voltage and the lower trip voltage from the first trip control voltage and the second trip control voltage, the hysteretic comparator being in electrical communication with the trip control voltage generator to receive the first trip control voltage and the second trip control voltage.

4. The circuit arrangement according to claim 3, wherein the converter current period controller comprises:

a converter current period detector operable to establish the second current control indicator, the second current control indicator being associated with the converter current period, the converter current period detector being in electrical communication with at least one of the group consisting of the converter current sensor, the hysteretic comparator and a LED circuit load detector, to receive at least one of the group consisting of the converter current sensing voltage, the switching control voltage and a LED circuit load, wherein the trip control voltage generator is operable to establish the first trip control voltage and the second trip control voltage in response to the second current control indicator associated with the converter current period in order to control the converter current period to be within a period control range, the trip control voltage generator being in electrical communication with the converter current period detector to receive the second current control indicator.

5. The circuit arrangement according to claim 4, wherein the trip control voltage generator is operable to establish the first trip control voltage and the second trip control voltage from a reference voltage and a hysteresis voltage, and wherein the trip control voltage generator is operable to control the hysteresis voltage in response to the second current control indicator in order to control the converter current period.

6. The circuit arrangement according to claim 4, further comprising an resistive digital-to-analogue converter, the resistive digital-to-analogue converter comprising:

a converter reference voltage supply arranged to provide a converter reference voltage, a series circuit of resistors in electrical communication with the converter reference voltage supply, and a first switch array and a second switch array comprising a plurality of switches;

wherein each of the switches of the first and second switch array is in electrical communication with the series circuit of resistors tapping off at a corresponding position along the series circuit of resistors, and wherein each switch array is arranged to be controlled with a digital control word comprising a plurality of bits, the bits being associated with controlling the switches to tap off the series circuit of resistors at the corresponding position;

wherein the first trip control voltage and the second trip control voltage are tapped from the same series circuit of resistors with the first switch array and the second switch array respectively.

7. The circuit arrangement according to claim 6, further comprising a R-DAC memory, wherein the digital control word R-DAC switch settings are stored in and retrieved from the R-DAC memory.

8. The circuit arrangement according to claim 2, further comprising:

a memory unit comprising a table comprising voltage settings for a plurality of indicator values, and wherein the trip control voltage generator is operable to retrieve voltage settings in response to the second current control indicator in order to establish the first trip control voltage and the second trip control voltage.

9. The circuit arrangement according to claim 1, further comprising:

a spread-spectrum generator arranged for varying a centre duration of the period control range over a pre-determined spectral band.

10. The circuit arrangement according to claim 2, wherein the hysteretic comparator comprises a comparator having an inverting input and a non-inverting input, wherein the converter current sensing voltage is applied to the inverting input of the comparator, and wherein the hysteretic comparator comprises a multiplexer, the multiplexer being operable to provide the upper trip voltage and the lower trip voltage time-sequentially as a trip voltage to the non-inverting input of the comparator.

11. The circuit arrangement according to claim 2, wherein the switch-mode converter comprises:
- a switch in electrical communication with the hysteretic comparator to be opened and closed as a function of the switching control voltage.

12. The circuit arrangement according to claim 11, wherein the switch-mode converter further comprises:
- a component selected from the group consisting of a diode and a second switch, the second switch being in electrical communication with the hysteretic comparator to be closed and opened as a function of the switching control voltage,
- the component being in electrical communication with the switch via an output node,
- the output node being, during use, in electrical communication with the LED circuit arrangement.

13. The circuit arrangement according to claim 2, wherein the switch-mode converter is arranged for charging and discharging an inductive output filter, the inductive output filter being, during use, in electrical communication with the LED circuit arrangement.

14. The circuit arrangement according to claim 2, wherein the converter current sensor is arranged to determine the converter current sensing voltage from a voltage drop over a resistor, the resistor being arranged to transmit the converter current flowing through the circuit arrangement.

15. The circuit arrangement according to claim 14, wherein the circuit arrangement comprises the resistor and the resistor is in electrical communication with the circuit arrangement and with the converter current sensor.

16. The circuit arrangement according to claim 2, further comprising:
- a power supply operable to deliver an input voltage, the power supply being in electrical communication with the switch-mode converter to supply the switch-mode with the input voltage, and
- a capacitive input filter in electrical communication with the power supply.

17. The circuit arrangement according to claim 1, further comprising:
- a LED controller in electrical communication with the LED circuit arrangement, and
- wherein the LED circuit arrangement comprises a first LED segment and at least a second LED segment, the first LED segment being associated with a first switching element operable for controlling a path of the LED current through the first LED segment, the second LED segment being associated with a second switching element operable for controlling a path of the LED current through the second LED segment,
- the first and second switching elements each being operable by the LED segment controller for controlling a path of the LED current flowing through the LED circuit arrangement.

18. The circuit arrangement according to claim 17, wherein the first switching element is electrically parallel to the first LED segment,
- the second switching element is electrically parallel to the second LED segment, and
- the first and second switching elements each being operable by the LED segment controller for selecting the path of the LED current to pass through the LED segment associated with the respective switching element or to bypass the LED segment associated with the respective switching element.

19. A LED driver IC comprising a circuit arrangement according to claims 2.

* * * * *